US009955105B2

(12) United States Patent
Millson et al.

(10) Patent No.: US 9,955,105 B2
(45) Date of Patent: *Apr. 24, 2018

(54) MOUNTING APPARATUS FOR AN AUDIO/VIDEO SYSTEM AND RELATED METHODS AND SYSTEMS

(71) Applicant: Millson Custom Solutions Inc., Vancouver (CA)

(72) Inventors: Richard Blair Millson, Vancouver (CA); Alan Toyonobu Ima, Vancouver (CA)

(73) Assignee: Millson Custom Solutions Inc., Vancouver (CA)

( * ) Notice: Subject to any disclaimer, the term of this patent is extended or adjusted under 35 U.S.C. 154(b) by 109 days.

This patent is subject to a terminal disclaimer.

(21) Appl. No.: 15/052,745

(22) Filed: Feb. 24, 2016

(65) Prior Publication Data

US 2016/0173809 A1  Jun. 16, 2016

Related U.S. Application Data

(63) Continuation of application No. 14/000,196, filed as application No. PCT/CA2012/000151 on Feb. 17, 2012, now Pat. No. 9,273,473.

(Continued)

(51) Int. Cl.
*H04N 5/64* (2006.01)
*F16M 11/04* (2006.01)
(Continued)

(52) U.S. Cl.
CPC ............... *H04N 5/64* (2013.01); *E04B 1/38* (2013.01); *E04F 19/08* (2013.01); *F16M 11/048* (2013.01);
(Continued)

(58) Field of Classification Search
CPC .. H04N 5/64; E04B 1/38; E04F 19/08; F16M 11/08; F16M 11/048; F16M 13/02; F16M 2200/061
(Continued)

(56) References Cited

U.S. PATENT DOCUMENTS 4,296,280 A   10/1981  Richie
4,642,418 A    2/1987  Menchetti
(Continued)

FOREIGN PATENT DOCUMENTS

CN    101742189    6/2010
EP     1783420    5/2007
(Continued)

OTHER PUBLICATIONS

Samtec-Power Strip 25, www.samtec.com, 2011, 8 pages.
(Continued)

*Primary Examiner* — Allen Wong
(74) *Attorney, Agent, or Firm* — Kilpatrick Townsend & Stockton LLP

(57) ABSTRACT

An audio-video (AV) system in one embodiment includes a mounting apparatus for mounting the system to a wall support located behind a wall surface and within an in-wall space. The mounting apparatus includes a support member for supporting at least one component in a support space within the in-wall space, a display mounting member 30 for mounting a display device, and a removable wall opening cover for concealing at least a portion of the in-wall space that would otherwise be visible through a wall opening to a viewer. Various multimedia-supportive devices, including loudspeakers and a subwoofer, may be concealed behind the cover in the in-wall space.

88 Claims, 33 Drawing Sheets

Related U.S. Application Data

(60) Provisional application No. 61/457,278, filed on Feb. 17, 2011.

(51) Int. Cl.
*F16M 11/08* (2006.01)
*F16M 13/02* (2006.01)
*E04B 1/38* (2006.01)
*E04F 19/08* (2006.01)

(52) U.S. Cl.
CPC ............ *F16M 11/08* (2013.01); *F16M 13/02* (2013.01); *F16M 2200/061* (2013.01)

(58) Field of Classification Search
USPC .......................................................... 348/836
See application file for complete search history.

(56) References Cited

U.S. PATENT DOCUMENTS

| | | | |
|---|---|---|---|
| 5,402,502 A | 3/1995 | Boothroyd et al. | |
| 5,523,790 A | 6/1996 | Kalua | |
| 6,151,084 A | 11/2000 | Goto et al. | |
| 6,298,942 B1 | 10/2001 | Schlatmann et al. | |
| 6,473,138 B1 * | 10/2002 | Fenner | H04N 5/64 312/7.1 |
| 6,628,510 B2 | 9/2003 | Genin | |
| 6,687,380 B1 | 2/2004 | Vishwamitra | |
| 6,851,226 B2 | 2/2005 | MacGregor et al. | |
| D540,278 S | 4/2007 | Ju et al. | |
| 7,365,807 B2 | 4/2008 | Iwai | |
| 7,456,807 B2 | 11/2008 | Mizuno et al. | |
| 7,471,804 B2 | 12/2008 | Lee | |
| 7,515,403 B2 | 4/2009 | Hong | |
| 7,894,182 B2 | 2/2011 | Wang et al. | |
| 7,975,976 B2 | 7/2011 | Wohlford | |
| 8,130,328 B2 * | 3/2012 | Vermeulen | A47B 81/065 248/425 |
| 9,273,473 B2 | 3/2016 | Millson et al. | |
| 2005/0135068 A1 | 6/2005 | Huff | |
| 2006/0186277 A1 | 8/2006 | Miyashiro | |
| 2007/0046841 A1 | 3/2007 | Jacobsmeyer et al. | |
| 2007/0096606 A1 | 5/2007 | Ryu | |
| 2008/0054144 A1 | 3/2008 | Wohlford | |
| 2008/0080727 A1 * | 4/2008 | Prenta | H04R 1/026 381/152 |
| 2008/0309833 A1 | 12/2008 | Nakamura et al. | |
| 2009/0196455 A1 | 8/2009 | Lee | |
| 2009/0241437 A1 * | 10/2009 | Steinle | E04F 19/08 52/27 |
| 2010/0026912 A1 | 2/2010 | Ho | |
| 2012/0134519 A1 * | 5/2012 | Caldes | H04R 1/02 381/306 |
| 2013/0321715 A1 | 12/2013 | Millson et al. | |

FOREIGN PATENT DOCUMENTS

| | | |
|---|---|---|
| JP | 09237095 | 9/1997 |
| JP | 2009071711 | 4/2009 |
| WO | 03071050 | 8/2003 |
| WO | 2005120053 | 12/2005 |
| WO | 2012109739 | 8/2012 |

OTHER PUBLICATIONS

*International Application No. PCT/CA2012/000151, International Preliminary Report on Patentability dated Aug. 29, 2013, 8 pages.
International Application No. PCT/CA2012/000151, International Search Report and Written Opinion dated May 24, 2012, 10 pages.
U.S. Appl. No. 14/000,196, Notice of Allowance dated Nov. 24, 2015, 11 pages.

* cited by examiner

MOUNTING APPARATUS FOR AN AUDIO/VIDEO SYSTEM AND RELATED METHODS AND SYSTEMS

This application claims priority from U.S. application Ser. No. 14/000,196, filed Aug. 16, 2013, now U.S. Pat. No. 9,273,473 issued Mar. 1, 2016, which in turn claims priority from PCT/CA2012/000151, which in turn claims priority from U.S. App. No. 61/457,278 filed Feb. 17, 2011, the disclosures of which are incorporated by reference in their entirety for all purposes.

BACKGROUND OF THE INVENTION

1. Field of Invention

This invention relates generally to audio/video entertainment systems, and more particularly, to wall mounting of audio/video entertainment systems.

2. Description of Related Art

Modern multimedia systems such as audio-visual (AV) entertainment systems are increasingly used both in commercial and in residential settings. In the commercial sphere, high-end multimedia systems are installed in conference rooms and hotel rooms, for example, whereas in the residential sphere, integrated entertainment systems that can provide a credible home cinema experience are becoming popular. Multimedia systems typically integrate multiple components such as a display device (e.g., a high-definition television or HDTV, a projector and projector screen, or an LCD screen, LED screen or plasma screen), a loudspeaker system (e.g., 2.0 or 2.1 stereo, 3.1 channel or 5.1/7.1 surround sound configurations), and a signal source (e.g., a radio tuner or TV receiver, satellite receiver, compact disk or CD player, set-top box, IP-based Internet device, an optical disc player such as a DVD or Blu-ray player, a digital video recorder or DVR, and/or a video game console). A multimedia system may further include components or equipment that provides remote control or management, communication, computing, signal processing, switching, amplification and/or power supply functions. In many cases, these and other system components and equipment may be sourced from a variety of commercial vendors and are integrated manually and configured by multimedia system installers to form the multimedia system.

The integration and installation of such multimedia systems raises concerns for the design community (e.g., architects, interior designers), for builders and developers, for equipment installers, and even for end users (e.g., home owners, renters or hotel guests) about how equipment will be mounted or housed, how much space it will take, whether the end result is aesthetically pleasing, and whether it will be possible to upgrade or service the system with relative ease in the future, for example, by replacing or adding components. Further, the equipment must be adequately ventilated to allow for heat dissipation. Finally, it must produce high quality audio and/or video output.

It is especially difficult to address the above concerns given that consumers have strong but divergent preferences regarding which components should be integrated into their multimedia system and specifically how they are integrated or configured. One approach has been to use special furniture or custom millwork for multimedia system installations to address a consumer's aesthetic requirements (e.g., to match room décor) while facilitating flexibility in installation, integration and serviceability of the system. Unfortunately, such installations occupy valuable floor space and are often inelegantly bulky.

In-wall multimedia system installations, on the other hand, while saving on floor space and bulk, lack flexibility for accommodating a consumer's component preferences because many commercial off-the-shelf components cannot be easily mounted inside the confined space of a wall, and moreover, in-wall installation of such components may cause heat dissipation problems that can damage the system. In-wall multimedia system installations further tend to lack upgradability and serviceability due to the typical permanence of in-wall installation and the subsequent lack of access to in-wall system components.

It would be desirable to provide a mounting apparatus for a multimedia system and related methods and systems to address some of these concerns.

SUMMARY

Certain embodiments of the present invention provide advantages not provided or only partially provided by the known prior art, and address the aforesaid disadvantages and other disadvantages of the known prior art.

In certain embodiments, the AV system may be mounted such that substantially the entire the AV system (other than the display device) is contained within a confined space, for example, within a standard 4" stud wall, with only the display device and wall opening cover being visible to the viewer. The in-wall components in one embodiment may actually fit within about a 3.5" depth confined in-wall space, for example, on a yacht, or in any larger space.

Embodiments of the invention may include a cover for concealing a portion of the confined space, dimensioned to cover at least a peripheral portion of an in-wall space at least partially enclosed by an in-wall mounting frame, and adapted to be removably connected to the in-wall mounting frame. An outer edge of the cover may be dimensioned to extend beyond the perimeter of the display device so as to visually frame the display device to the viewer. To the viewer, the mounted display device visually appears to "float" on the wall with no immediately apparent means of attachment. The cover may be chosen to have a color or visual design that blends with existing room décor.

Advantageously, the use of a removable cover to conceal a peripheral portion of a finished wall opening that would otherwise be visible to a viewer, allows embodiments of the invention to provide a relatively large, user-accessible support space within the confined space for supporting/mounting in-wall components. The user-accessible support space may be dimensioned larger than the display device, contrary to one industry trend in which display mounting components are made to have a substantially smaller footprint than the display so that the display device can conceal them.

Advantageously, embodiments of the invention may avoid the need for custom millwork or custom cabinets to hold devices associated with the AV system, nor is it necessary to make multiple cuts or installations of components within discrete non-conjoined portions of the wall.

Alternatively, embodiments of the invention may be built into articles of furniture or cabinets having very limited depth or providing only a confined space within which to situate components of the AV system, such that only the display device and a cover is suspended from a vertical wall of the furniture in front of an opening into the confined space where the AV components are housed.

In certain embodiments, the mounting system may be capable of supporting display devices from about 46 inches to about 65 inches diagonally, and is adaptable to support display devices outside this range, for example, by scaling the support member and wall opening cover to a suitable size.

Embodiments of the invention may simplify prewiring installation by providing dedicated connection points for electrical and low-voltage wiring.

In certain embodiments, the entire AV system may be powered by a hidden in-wall power distribution module providing individually controllable AC power outlets for individual signal source components and the display device, as well as low voltage power connections to other components in the system. One benefit of this arrangement is that end users can control (e.g., turn on/off) the power to individual components without having to access the in-wall space.

Embodiments of the invention may include at least one integral or removable mounting panel that supports multiple local AV signal source components in a hidden confined space proximate the display device. Alternatively, or in addition, the mounting panel may support one or more signal distribution devices and/or amplification devices within the in-wall space.

Advantageously, embodiments of the invention may modularize the design of an AV system by omitting certain AV components from the display device that would perhaps otherwise be integrated with the display device, and instead locating these components in a hidden in-wall space. For example, some embodiments can obviate the need for a TV display to contain speakers since speakers can be embedded in the wall behind the TV. Consequently, the display device can be made thinner and less costly. In addition, components can be implemented within the wall in a way that takes advantage of the thickness and height and width of the support space available in the wall, thus allowing higher quality components to be used than would otherwise be used if these components had to be embedded in the display device. One example is that in-wall speakers can be of higher quality than the speakers in a TV.

Accordingly, some embodiments of the invention may provide a compact, elegant and unobtrusive system installation for providing high quality entertainment or cinema-like experiences, and may include, for example, a display, high performance front loudspeakers and multiple surround loudspeakers, state-of-the-art multi-channel power amplification, switching and distribution of multiple audio and/or video sources, audio processing and decoding for existing Dolby and DTS formats (and adaptable to others) with power distribution and surge protection for all electronics. Any electronics (including speakers) embedded in the wall are hidden from view while in use by an attractive removable cover, yet such components remain accessible, serviceable, and upgradeable to a service technician upon removal of the cover.

Embodiments of the invention may include dedicated pathways and connection points for electrical, audio, video, speaker level, data and communication, to simplify prewiring and installation and eliminate any possibility for miswiring internal components. For example, one or more of the power distribution module, power amplifier, the signal processor, and the plurality of speakers may include connectors operably configured to mate with complementary connectors electrically connected to a common power and signal distribution circuit, to provide a quick, neat, simple and reliable method of interconnecting these components correctly via the distribution circuit notwithstanding the limited space available for making such interconnections.

The system may be readily upgradeable in terms of its looks by unsophisticated persons such as interior designers, and in terms of its hardware, by unsophisticated service technician due to the modularity of system components and the plug-and-play simplicity of their interconnection. For example, because the cover is removably mounted, it may be upgraded by an interior designer to provide a new look by ordering a cover with a new designer fabric. To take another example, because a substantial number of the in-wall components of the system are readily accessible from outside the wall and are removably mounted, the components can be upgraded quickly and easily by a relatively unskilled service technician with extremely low risk of error.

Apart from supporting simple switching or multiplexing between two or more AV signal sources, the signal processor may support more sophisticated processing, including decoding of HDMI 1.4, HDCP 2.0, 3D, ARC, and all major Dolby® and DTS® surround formats. However, as new formats and standards are developed, the system may be upgraded by replacing its hardware (as described above) or by installing new software into the signal processor.

In accordance with one illustrative embodiment, there is provided a mounting apparatus for an audio-video system. The mounting apparatus includes a support member providing a support space for holding at least one component of the audio-video system, the support member being operably configured to be installed in an in-wall space located within a wall such that the support space is disposed within the in-wall space and is accessible through a wall opening of the wall, the support member defining an access region operable to register with the wall opening to provide access to the support space through the wall opening from outside the wall. The mounting apparatus also includes a display mounting member connected to the support member and operably configured to mount a display device such that the display device, when mounted, is positioned outside the wall to conceal a first portion of the in-wall space from a viewer situated to view the display device from a display viewing position outside the wall. The mounting apparatus also includes a cover operably configured to be removably mounted in a plane disposed generally in parallel to a plane of the wall and interposed between the support space and the display device, the cover being dimensioned to conceal a second portion of the in-wall space which would be visible in a line of sight from the viewing position and which would not be concealed from the viewer by the display device when the display device is mounted on the display mounting member.

In accordance with another illustrative embodiment, there is provided a method of mounting an audio-video system to a wall support located in an in-wall space behind a wall surface supported by the wall support. The method involves supporting at least one component of the audio-video system in a fixed position relative to the wall support, within a support space located inside the in-wall space such that the support space is accessible from outside the wall surface through an opening in the wall surface. The method also involves mounting a display device to the wall support such that the display device is positioned outside the wall surface to conceal a first portion of the in-wall space that would otherwise be visible through the opening in the wall surface, to a viewer situated to view the display device from a viewing position outside the wall surface. The method also involves obstructing a line of sight of the viewer at the viewing position in a generally planar obstruction region disposed between the in-wall space and the display device and spaced apart from the display device, the obstruction region extending beyond a periphery of the display device and being oriented generally parallel to a plane of the wall surface, to conceal a second portion of the in-wall space that would otherwise be visible through the opening in the wall surface to the viewer at the viewing position.

In accordance with another illustrative embodiment, there is provided an apparatus for mounting an audio-video system to a wall support located in an in-wall space behind a wall surface supported by the wall support. The apparatus includes means for supporting at least one component of the audio-video system in a fixed position relative to the wall support, within a support space located inside the in-wall space such that the support space is accessible from outside the wall surface through an opening in the wall surface. The apparatus also includes means for mounting a display device to the wall support such that the display device is positioned outside the wall surface to conceal a first portion of the in-wall space that would otherwise be visible through the opening in the wall surface, to a viewer situated to view the display device from a viewing position outside the wall surface. The apparatus also includes means for obstructing a line of sight of the viewer at the viewing position in a generally planar obstruction region disposed between the in-wall space and the display device and spaced apart from the display device, the obstruction region extending beyond a periphery of the display device and being oriented generally parallel to a plane of the wall surface, to conceal a second portion of the in-wall space that would otherwise be visible through the opening in the wall surface to the viewer at the viewing position.

In accordance with another illustrative embodiment, there is provided a cover operably configured to be removably mounted between a display device mounted outside a wall and an in-wall space located within the wall and accessible from outside the wall through a wall opening in the wall, the wall opening being dimensioned larger than the display device in at least one dimension of height and width, wherein the cover is dimensioned to conceal a peripheral portion of the wall opening that is not otherwise concealed from the viewer by the display device at a display viewing position.

In accordance with another illustrative embodiment, there is provided a method of installing in a wall a mounting apparatus for an audio-video system. The method involves connecting a support member of the mounting apparatus to a support for supporting a wall surface and located in an in-wall space of the wall, the support member being operably configured to support at least one component of the audio-video system in a support space within the in-wall space. The method also involves mounting a first signal source device on a signal source device mounting member supported by the support member, wherein both the signal source device member and the first signal source device are located in the support space within the in-wall space. The method also involves removably mounting a cover to conceal at least a peripheral portion of the in-wall space from a display viewing position outside the wall. The method also involves mounting a display device to a display mount member supported by the support member, such that the display device is spaced apart from the wall and held in front of the wall to be viewable by a viewer located at the display viewing position, the display device being positioned to conceal a generally central portion of the in-wall space from the viewer at the display viewing position. The method also involves electrically coupling a first signal from the first signal source device in the support space to the display device. The display device and cover, when both mounted, cooperate to conceal the entirety of the in-wall space from the viewer at the display viewing position.

In accordance with another illustrative embodiment, there is provided an audio-video system. The audio-video system includes a support member providing a support space for holding components of the audio-video system, the support member being installed in an in-wall space located within a wall such that the support space is disposed within the in-wall space and is accessible through a wall opening of the wall, the support member defining an access region operable to register with the wall opening to provide access to the support space through the wall opening from outside the wall. The audio-video system also includes a display mounting member connected to the support member and operably configured to mount a display device such that the display device is positioned outside the wall. The audio-video system also includes a signal processor operably configured to receive a plurality of input signals from a plurality of signal sources and to generate a first output signal to the display device based on the plurality of input signals, the signal processor being mounted in the support space. The audio-video system also includes a display device mounted on the display mounting member and spaced apart from the first signal source, the display device being configured to receive the first output signal from the signal processor.

In accordance with another illustrative embodiment, there is provided an entertainment system having a positionable in-wall loudspeaker mounting. The entertainment system includes a support member providing a support space for holding at least one component of the audio-video system, the support member being operably configured to be installed in an in-wall space located within a wall such that the support space is disposed within the in-wall space and is accessible through a wall opening of the wall, the support member defining an access region operable to register with the wall opening to provide access to the support space through the wall opening from outside the wall. The entertainment system also includes a display mounting member connected to the support member and operably configured to mount a display device such that the display device, when mounted, is positioned outside the wall to conceal a first portion of the in-wall space from a viewer situated to view the display device from a display viewing position outside the wall. The entertainment system also includes a support member providing a support space for holding at least one component of the audio-video system, the support member being operably configured to be installed in an in-wall space located within a wall such that the support space is disposed within the in-wall space and is accessible through a wall opening of the wall, the support member defining an access region operable to register with the wall opening to provide access to the support space through the wall opening from outside the wall. The entertainment system also includes a loudspeaker mounting member including a guide for receiving a loudspeaker enclosure into a mounted position in which the loudspeaker will project sound in a line of sight towards a viewer position without obstruction of the sound by the display device.

It should be appreciated that the invention is not limited to the embodiments described in this summary section, but may also be implemented in numerous different embodiments. Moreover, this summary section does not purport to exhaustively summarize all advantages of every possible embodiment of the invention. It should be appreciated that different embodiments of the invention may provide different advantages relative to each other and relative to the prior art and may address different disadvantages present in the prior art.

Other aspects and features of the present invention will become apparent to those ordinarily skilled in the art upon review of the following description of specific embodiments of the invention together with the accompanying figures.

BRIEF DESCRIPTION OF THE DRAWINGS

In drawings which illustrate embodiments of the invention.

DETAILED DESCRIPTION

Figure 1:
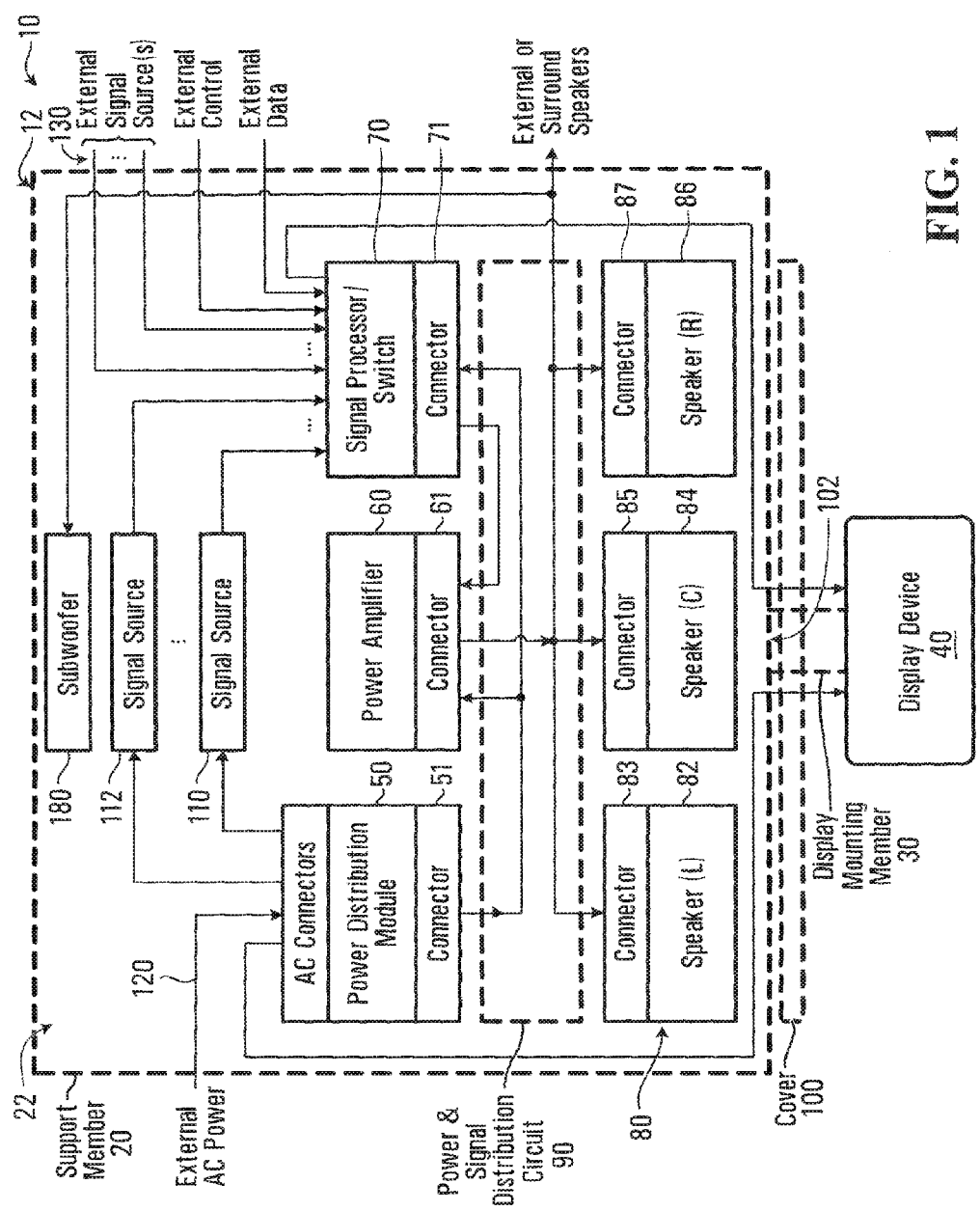
FIG. 1 is a simplified block diagram of an audio-video system and an apparatus for mounting the audio-video system in a wall.

Referring to FIG. 1, an audio-video system according to one embodiment of the invention is shown generally at 10. The system 10 includes a mounting apparatus 12 for mounting the audio-video system to a wall support 16 located behind a wall surface 104 in an in-wall space 18. The mounting apparatus 12, and thus the system 10, includes a support member 20 for supporting at least one component in a support space 22 within the in-wall space 18, a display mounting member 30 for mounting a display device 40, and a cover 100 for concealing at least a portion of the in-wall space 18 that would otherwise be visible to a viewer positioned outside the wall 14 to view the display device 40, for example, a person sitting in the room and watching TV on the display device 40.

In the embodiment shown in FIG. 1, the system 10 includes a plurality of devices and components supported by the support member 20 in the support space 22 within the wall. The devices and components that are supported by the support member 20 may be mounted directly to the support member 20, or may be indirectly supported by the support member 20 through a mounting mechanism, for example, they may be mounted to a removable mounting panel or bracket that, in turn, is supported by the support member 20.

The embodiment shown in FIG. 1 includes a power distribution module 50, a multi-channel audio power amplifier 60, a signal processor 70, one or more signal source devices 110, 112, and a plurality of speakers 80 including a subwoofer 180, all supported by the support member 20 in the support space 22. The system 10 further includes a display device 40 mounted outside the support space 22 and outside the wall 14 and configured to cooperate with the components and devices within the support space 22 to produce a coordinated audio-visual presentation to the viewer.

In general, the system 10 includes a video subsystem and an audio subsystem. The video subsystem includes any internally-supported signal source devices or external signal sources that provide video signals, the display device 40 and the signal processor 70. The audio subsystem includes any internally-supported signal source devices or external signal sources that provide audio signals, as well as the power amplifier 60 and the speakers. The embodiments where the signal processor 70 is capable of processing (including switching) both audio and video, it forms a part of both the audio and video subsystems. The signal processor 70 may include an AV preamp and/or a digital signal processing (DSP) circuit for transforming the audio- or video-stream.

The power distribution module 50 provides AC power and low-voltage power to various devices and components of the audio-video system 10.

The plurality of loudspeakers, may include left, center and right speakers (also known as LCR speakers), however, it will be appreciated that many other configurations including 2 channel stereo, 2.1 channel stereo, 5.1/7.1 surround configurations or larger are possible. In some embodiments, one or more of the speakers (or even all the speakers) may be provided externally to the support space 22. The loudspeakers and subwoofer 180 produce high-quality audio in response to signals originating from the signal processor 70 that have been further amplified by the power amplifier 60. The signal source apparatuses or devices can produce at least one AV signal source output for use by at least one of the audio and video subsystems.

Low-voltage power may be provided from the power distribution module 50 to the power amplifier 60 and signal processor 70 via a distribution circuit 90 mounted in the support space 22. Audio signals from the signal processor 70 may be connected to the power amplifier 60 and forwarded to the speakers through the distribution circuit 90. Similarly, speaker level audio signals from the power amplifier 60 may be transferred to the speakers via the distribution circuit 90. The distribution circuit 90 may be simultaneously carrying power and AV signals and may include a backplane or bus to facilitate distribution of electrical signals. The distribution circuit 90 may also carry control and data signals in some embodiments. The distribution circuit 90 may include a first plurality of connectors operably configured to mate with a complementary second plurality of corresponding connectors on one or more of the power distribution module 50, power amplifier 60, the signal processor 70, and the plurality of speakers 80, to provide a quick, neat, simple and reliable method of interconnecting these components correctly with respect to power, AV signals, control signals or data, notwithstanding the limited in-wall space available for making such interconnections. Examples of the first plurality of connectors include 510, 610, 710, 830, 850, 870 in FIG. 4, and 512, 514, 612, 614, 616, 712, 714, 716, 830, 850 and 870 in FIG. 17. Examples of the second plurality of connectors include 51, 61, 71, 83, 85, 87 in FIG. 1.

Figure 2:
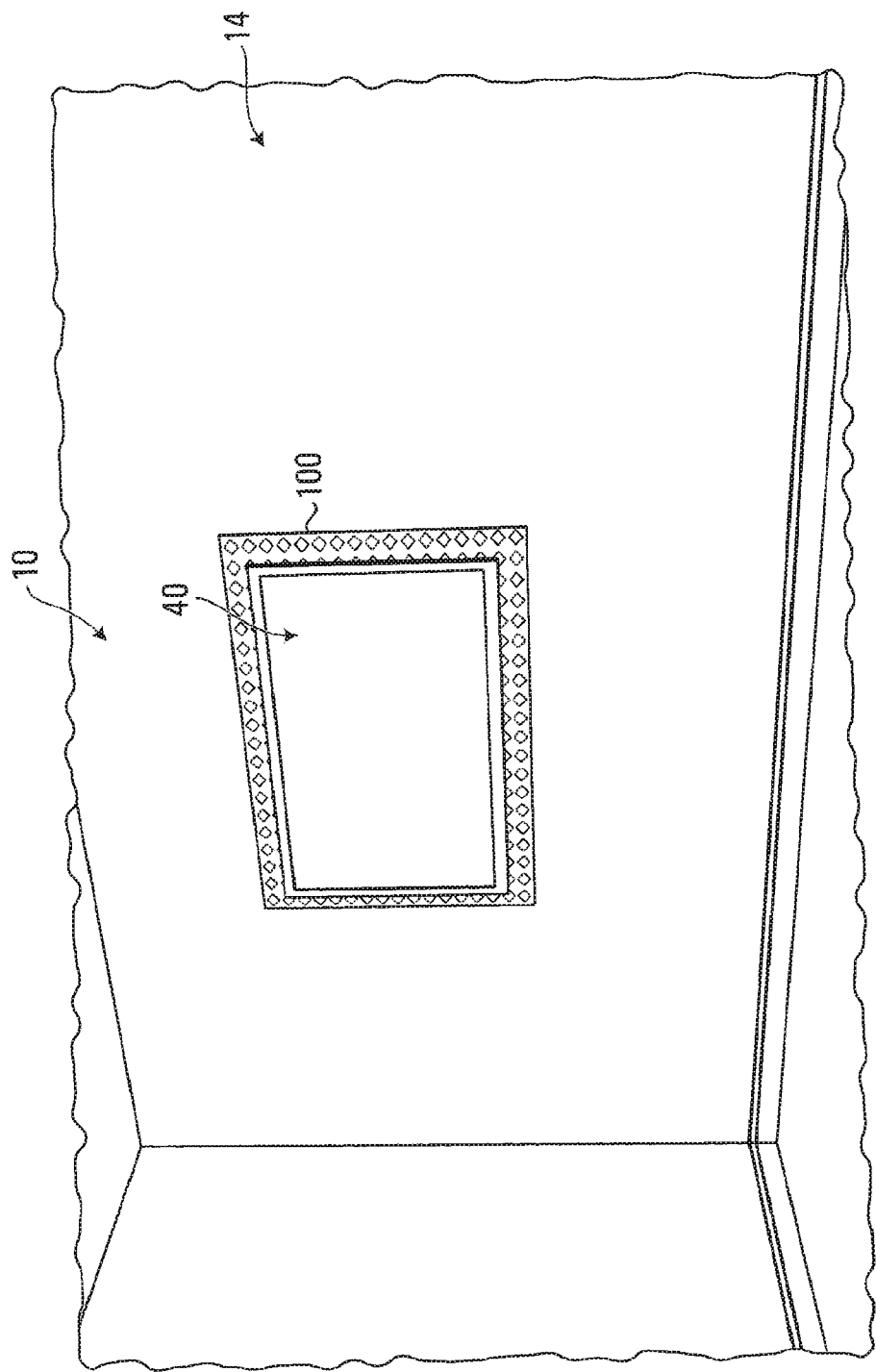
FIG. 2 is a perspective front view of a room featuring an installed audio-video system including a display device such as a TV mounted to a wall with a substantial proportion of the electronic components of the system concealed within the wall and thus invisible, the system being viewed from a viewer position.

FIG. 2 is a perspective view of one embodiment of the system 10 shown in FIG. 1 after it has been completely installed, as viewed by a human viewer located in a particular viewing position suitable for viewing the display device 40. This particular viewing position is displaced about 20 to 30° to the side from a direct viewing position in front of and perpendicular to the display device 40. As seen in FIG. 1, most of the components of the audio-video system 10 are housed inside the wall 14 with the exception of an on-wall cover 100 and the display device 40 (e.g., a TV), which are disposed in front of the wall surface 104 and did not occupy any space within the wall 14 in this embodiment.

Figure 3:
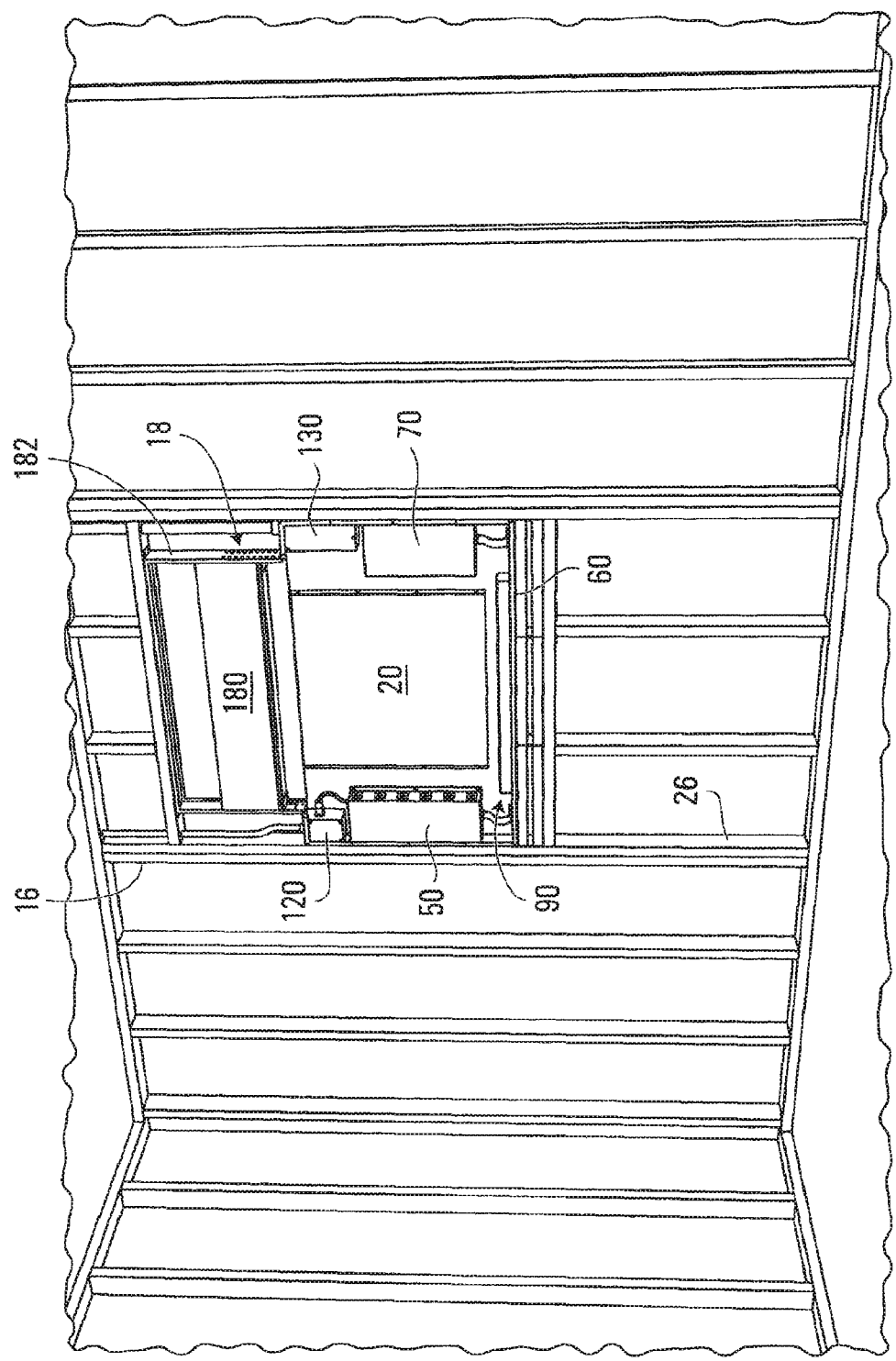
FIG. 3 is a perspective front view of the audio-video system shown in FIG. 2, with the display device, wall surface, and a wall opening cover not yet installed (or removed) thereby making electronic components supported within the wall visible from the viewer position adopted in FIG. 2.

Referring now to FIG. 3, the embodiment shown in FIG. 2 is shown with the display device 40, cover 100, and the wall surface 104 removed. The system 10 includes a mounting apparatus 12 for mounting an audio-video (AV) system 10, the mounting apparatus 12 including a support member 20 operably configured to support at least one component of the AV system 10 in a support space 22 adjacent the support member 20. The support member 20 is adapted to be mounted to at least one wall support, to which a final wall surface 104 will be attached and by which the wall surface is supported in a position between a floor and the ceiling of the room. In the embodiment shown in FIG. 3, the wall surface 104 is supported with wooden wall supports, namely, a plurality of vertically oriented 2×4 wooden studs spaced apart 16 inches on center. In other embodiments, the wall support could be different, for example, it could include a steel stud or poured concrete. In other contexts, for example, on a yacht, the wall 14 may include aluminum or fiberglass supports, to which the mounting apparatus 12 may be secured.

FIG. 3 also illustrates how, in one embodiment, the mounting apparatus 12 for mounting an audio-video system 10 would be installed at an early stage of construction of a wood-framed building, before the installation has commenced of the ultimate wall surface 104, which may be typically gypsum wallboard or drywall. It will be appreciated that if an already built wall is renovated or retrofitted in accordance with the present invention, it may be necessary to remove at least a portion of the existing wall surface 104 in order to connect the support member 20 to one of the wall supports. Advantageously, in this embodiment, it is unnecessary to cut out multiple sections of drywall from different areas of the wall 14; only one continuous section of the wall surface 104 is removed in order to provide an opening 102 in the wall surface through which the support member 20 can be inserted into the in-wall space 18 and secured.

Support Member

Figure 4:
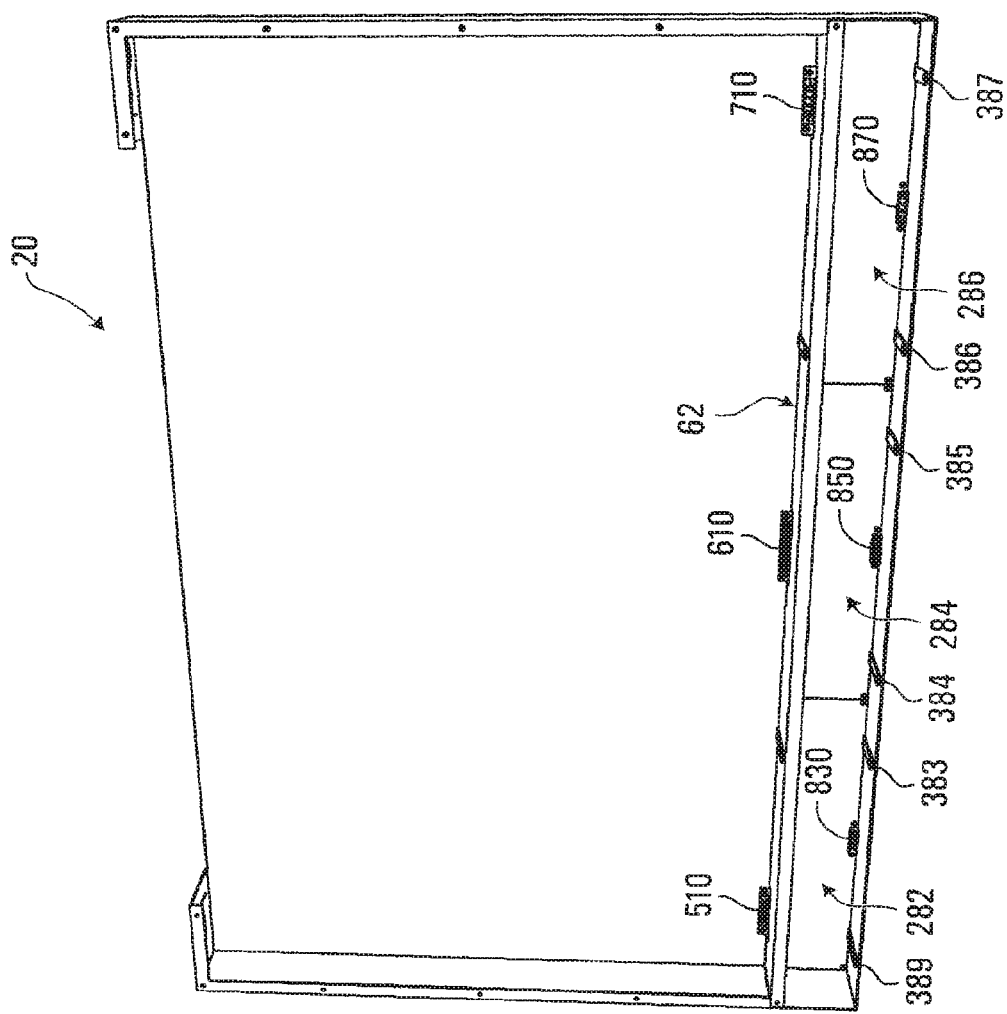
FIG. 4 is a perspective front view of the support member operatively configured to support the plurality electronic components in a sport space adjacent to support member, support member being adapted to be mounted to a wall support member in the wall (such as a wooden 2"×4" wall framing stud)

Referring now to FIG. 4, a support member 20 of the mounting apparatus 12 is shown according to one embodiment. The support member 20 is operably configured to support a plurality of components and devices in an adjacent support space 22, and is further configured to be installed (together with any items supported in the support space 22), into an in-wall space 18 within a wall, for example, by being mounted to a wall support, such as a wooden wall stud. Alternatively, items may be mounted to be supported by the support member 20 in the support space 22 after the support member 20 has been installed in a wall.

Figure 11:
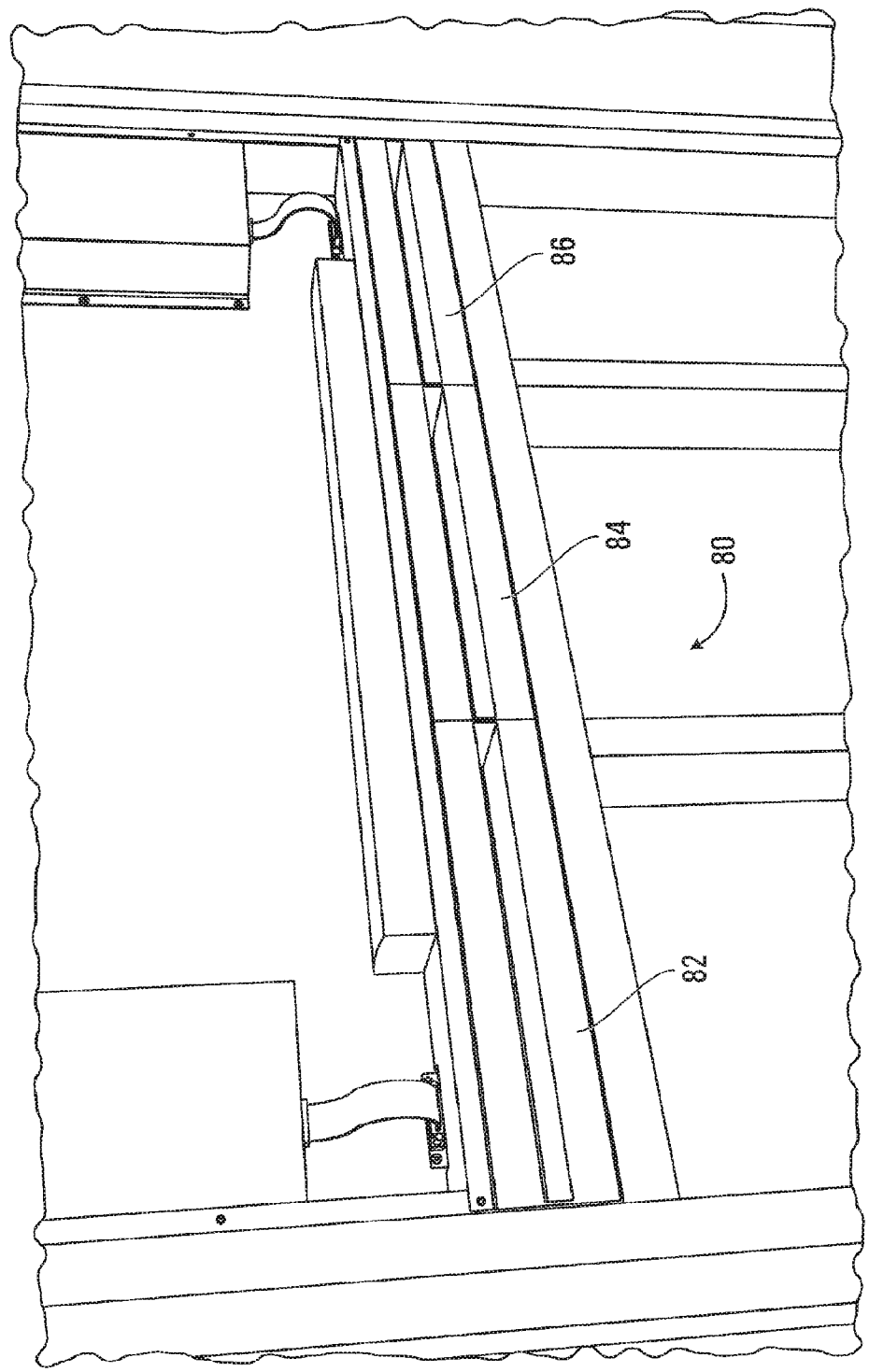
FIG. 11 is a perspective view of the lower portion of the support member with the plurality of speakers (e.g., LCR speakers) received in a receptacle formed in the support member for receiving speakers, the speakers being electrically coupled to the power amplifier shown in FIG. 10.

The support member 20 in the embodiment of FIG. 4 includes a generally box-shaped frame constructed of high-quality powder coated steel or another suitable material. The support member 20 has a top side, a bottom side, a left side, a right side, a front side and a rear side. The front side of the support member 20 is generally open to provide a support space 22 for holding components. The rear side of the support member 20 includes a sheet or plate to which components may be mounted. The left and right sides include respective left and right flanges that may be used to mount the support member 20 to a wall support. The support member 20 includes a plurality of multi-conductor connectors including a connector for a power distribution module 50, a connector for an AV preamp or processor, a connector for a multichannel audio amplifier, and a plurality of connectors corresponding to respective loudspeakers that may be mounted on the support member 20. The support member 20 further includes a transversely oriented guide member operable to help guide a plurality of components to align with and connect to the aforesaid connectors. For example, as shown in FIG. 11, the guide member helps to align the power amplifier 60 and a plurality of loudspeakers to mate with the corresponding connectors on the support member 20. A bottom side of the guide member forms an upper portion of a channel for receiving the loudspeakers into mounted position on the support member 20. In this embodiment, the guide member includes a shelf spanning and connected to the left and right flanges.

Referring back to FIG. 4, the support member 20 in this embodiment is dimensioned to be installed into any location with a minimum depth of about 3.5 inches to about 4 inches or greater. This support member 20 depth is compatible with the vast majority of both new construction and renovation applications in North America that typically used 2"×4" inch nominal wall framing as a minimum. In this embodiment, a rough opening 102 in the wall framing of about 48"×48" is used to support a wide range of display device 40 sizes of about 46 inches to about 65 inches in one embodiment. Once the support member 20 has been installed within the wall, a portion of the wall surface 104 may be replaced such that the final opening 102 in the wall surface is less than the initial 48"×48" opening. Once installation of the system 10 is complete, the opening visible to a viewer of the display device 40 is only slightly larger than the outer dimensions of a television or other display device 40.

Depending on the embodiment, the support member 20 may include dedicated spaces, mounting points, alignment guides and, in some cases, connections for the subwoofer 180, LCR speakers 80, power distribution module 50, AV pre-amp/processor, power amplifier 60, an AV signal source mounting plate, a wall surface interface member, a display mounting system, or some combination thereof. The support member 20 may include dedicated junction boxes, conduit openings and/or connection points to allow the installation and connection of the required electrical power at the pre-construction stage, prior to the installation of the final wall surface (typically gypsum wall board or similar). These items may be an integral or permanent part of the support member 20 or may be removably mounted. Likewise, the support member 20 may provide these or analogous features to facilitate low voltage connections being made in the support area by an electronic systems contractor or service technician.

The support member 20 provides an access region for accessing items supported by the support member 20. In this embodiment, the access region includes an open side portion of the support member 20 operable to register with a corresponding wall opening 102 when the support member 20 is installed in a wall, to facilitate access to the line voltage and low-voltage connections (and other internal components) for service through the wall opening 102 even after installation of the wall surface. As will be described below, in normal use, the wall opening 102 is kept hidden behind the display device 40 and/or the cover 100.

Subwoofer Mount

Figure 5:
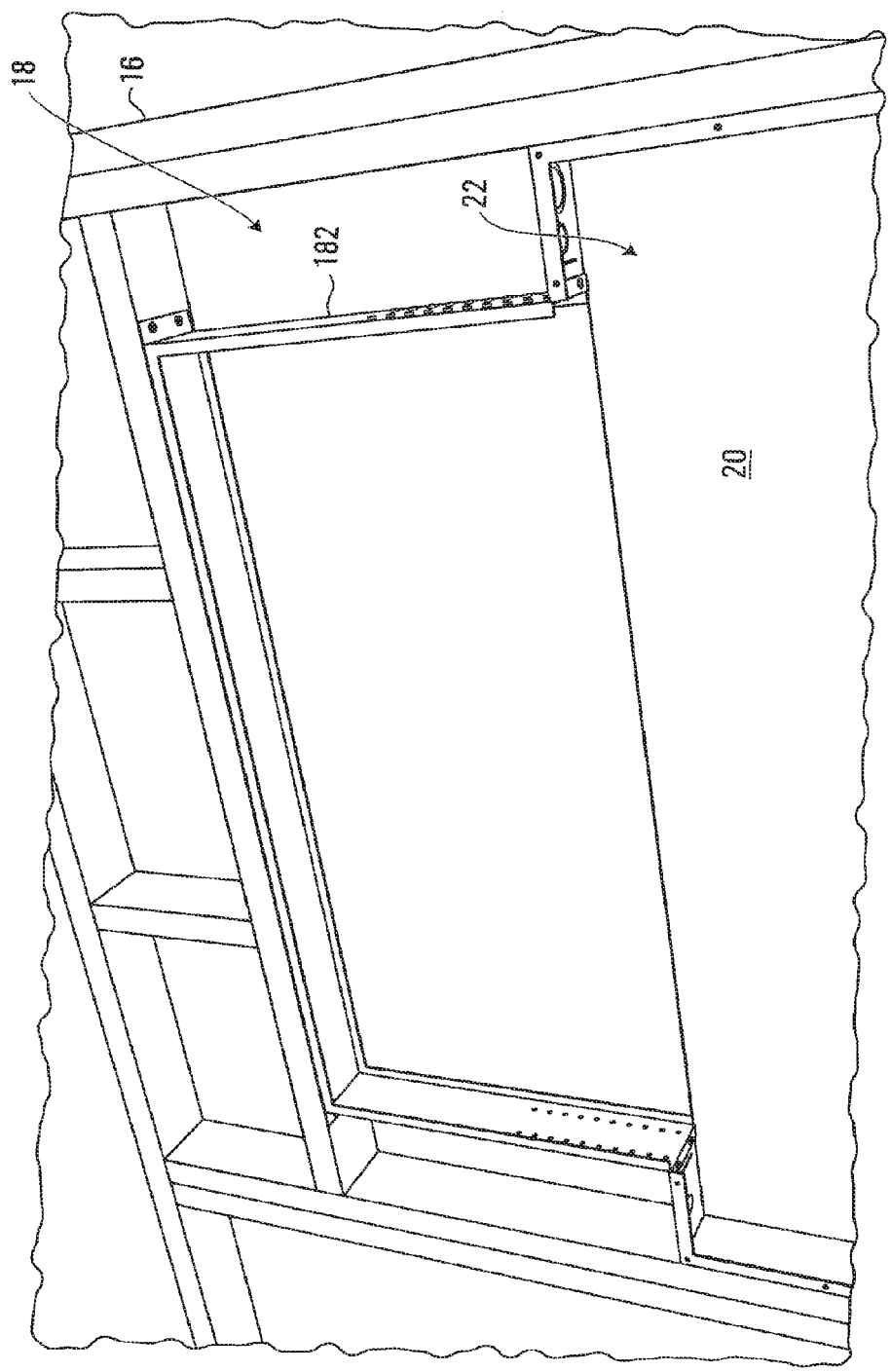
FIG. 5 is a perspective front view (at an upwardly inclined angle) of the top portion of the support member shown in FIG. 4, the support member having an attached subwoofer mount for slidingly and removably mounting a subwoofer within the wall.
Figure 18:
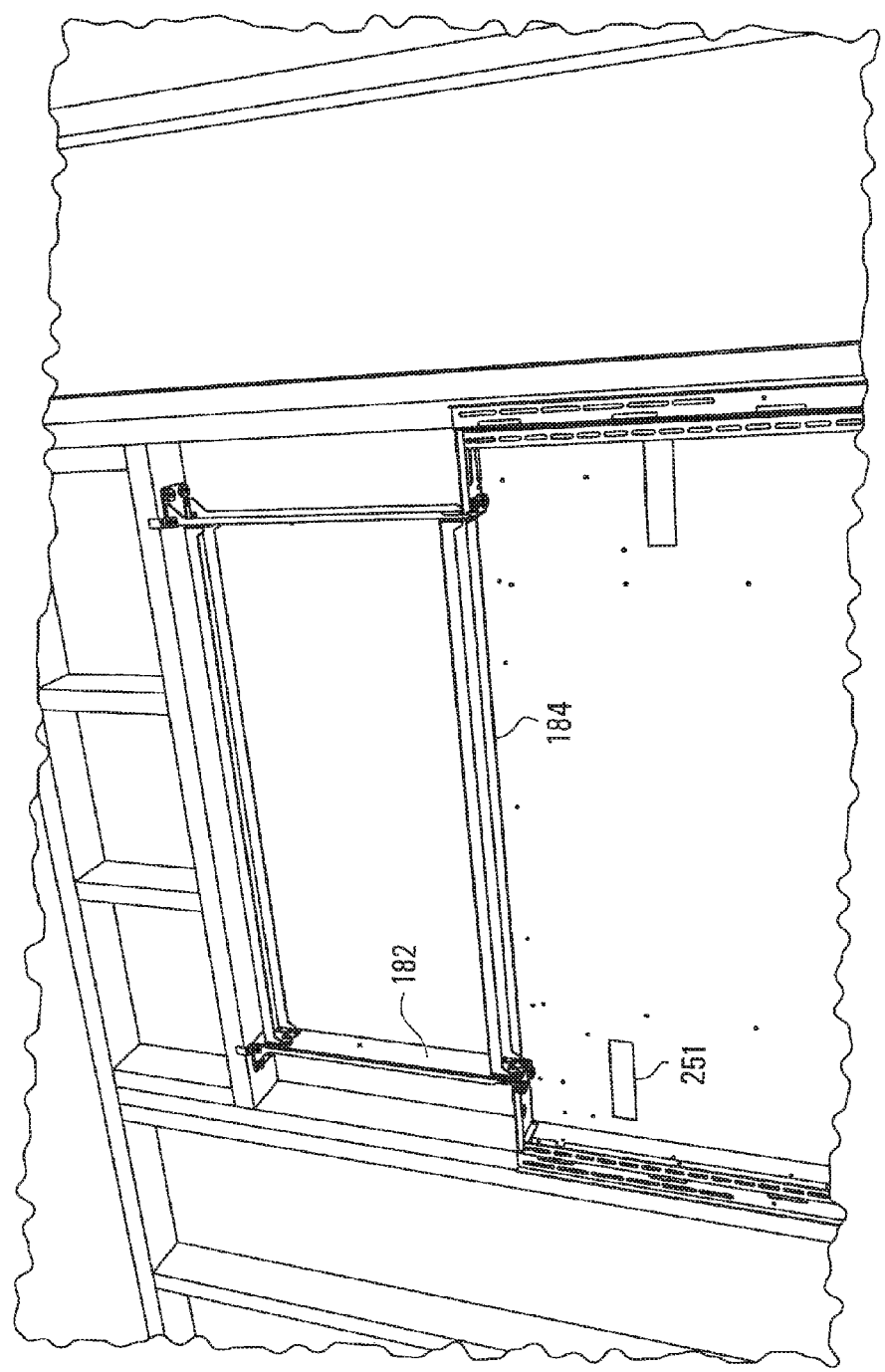
FIG. 18 is a perspective view of the top portion of the support member of FIG. 17, the support member having an attached subwoofer mount operatively configured to isolate the vibrations of the subwoofer from the wall structure, FIG. 18 also illustrating the use of a temporary brace to ensure accurate alignment while affixing the apparatus to the wall structure.

Referring to FIGS. 5 and 18, in some embodiments, the support member 20 may include a subwoofer mount 182 for mounting a subwoofer 180 in the support space 22. The subwoofer mount 182 may include a subwoofer mounting bracket that is positioned or attached to the top side of the support member 20 and is further affixed to the wall support 16. The subwoofer mount is configured to slidingly receive the subwoofer enclosure into an operating position thereby permitting the installation of a subwoofer loudspeaker after the final wall surface has been installed and after installation of the support member 20 in the wall.

In one embodiment (FIG. 5), the subwoofer mounting bracket includes integral threaded mounting points and associated speaker support clamps to provide the ability to adjust the vertical positioning and placement of the subwoofer. In another embodiment (FIG. 18), the subwoofer mount includes a self-aligning mechanism including centering pins on the subwoofer mounting bracket that are adapted to cooperate with a corresponding guide on the sides of a subwoofer enclosure to progressively align the subwoofer enclosure as it is pressed into its final centered mounted position.

Figure 26:
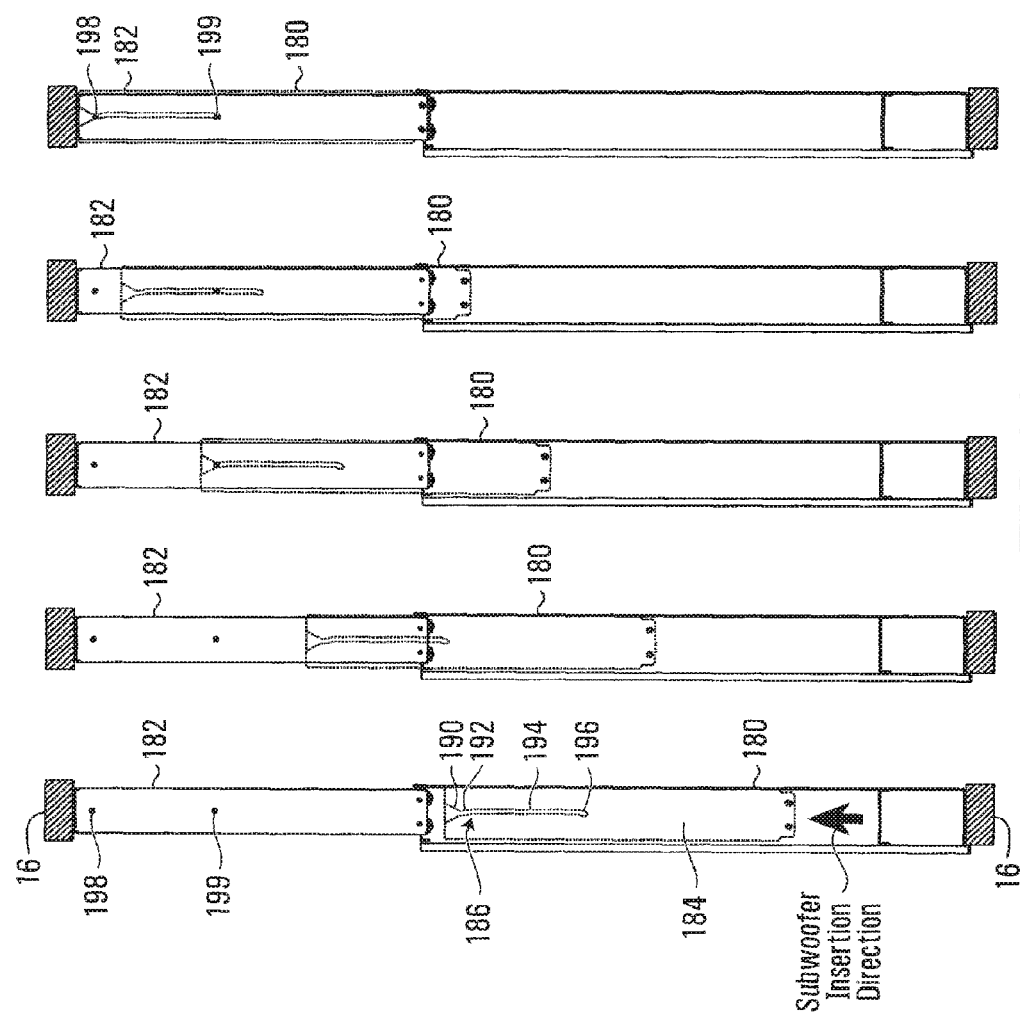
FIG. 26 is a time series of five side section views of the support member of FIGS. 18-25 as a subwoofer enclosure is gradually moved into an operating position in the subwoofer mount, the subwoofer mount and subwoofer enclosure having a self-alignment mechanism including a guide and centering pins for ensuring that the subwoofer is accurately centered in the in-wall space.

Installation of the subwoofer enclosure in the latter embodiment is further illustrated in FIG. 26. FIG. 26 provides a series of five side sectional views illustrating (from left to right) the progress of installation of the subwoofer enclosure at five consecutive points of time. The subwoofer enclosure is pressed against the back surface of the support member 20 and lifted upwards until a first centering pin on the subwoofer bracket enters a funnel-shaped first portion of the guide on the side of the subwoofer enclosure. Further movements of the subwoofer enclosure in the installation direction cause the enclosure to be centered due to the first centering pin entering a more constricted portion of the guide. Further upward movement of the enclosure causes the first centering pin to move along the guide in a nonlinear path defined by second, third and fourth portions of the guide, each defining a path oriented at a slightly different angle. As the enclosure moves towards its final operating position, the second centering pin enters the funnel-shaped portion of the guide. Eventually, the first and second pins come to rest in the fourth and second portions of the guide, respectively, whereby the subwoofer enclosure is held in its final operating position, precisely centered within the mount and also within the in-wall space, such that the enclosure is spaced apart approximately equally from the inner wall surfaces on either side of it. In another embodiment, the guides could be implemented on the subwoofer mounting bracket with the centering pins being on the enclosure.

Vertical adjustment of the subwoofer loudspeaker allows the installer to precisely align a subwoofer driver opening from which sound will exit, between the top of the display device 40 and an upper edge of the support space cover 100 in order to minimize the blockage of sound from the subwoofer by the display device 40.

In this embodiment, vertical adjustment of the subwoofer loudspeaker allows the support member 20 to accommodate display devices 40 of various sizes without the display device 40 interfering with the sound output from the subwoofer. Moving the subwoofer to a higher position opens up a portion of the support space 22 below the subwoofer, and this support space 22 portion may be used to support other system components. Moving the subwoofer to a lower position reduces the vertical dimension of the wall surface used by the system 10 in cases where a smaller display devices 40 is used, thereby reducing the overall footprint of the installation. In some embodiments, the mounting position of the subwoofer may be horizontally adjustable, or the subwoofer may be located in a different location, such as the bottom side of the support member 20.

The subwoofer mount may include a physical means of isolating it from the support member 20 and the structure of the wall (or a different kind of mounting cavity). For example, referring to FIG. 18, the subwoofer mount may be isolated from the points to which it is affixed by vibration isolators which may include PVC/rubber/neoprene isolation grommets added at the mounting points of the subwoofer mount, for example, the point at which the subwoofer mount is screwed into the support member 20 at one end and the wall supports (e.g., wood framing of the wall) at the other end. The vibration isolators provide a single mounting hole for affixing but are also designed such that no actual physical contact is made between the subwoofer mount and the support member 20 or framing support structure (see FIG. 18).

The subwoofer mount may also include subwoofer centering pins 198, 199. These pins, along with a corresponding slot opening 186 in both ends of the subwoofer enclosure, cooperate to precisely position the enclosure in the centre of the available space such that it does not make physical contact with the front or back wall surfaces. This embodiment is designed to create physical separation between the subwoofer enclosure and the wall surfaces, further reducing the transmission of vibration from the subwoofer enclosure to the surrounding wall structure. A foam isolation strip may be located in the narrow space between the side of the subwoofer enclosure and the subwoofer mounting bracket to further reduce any transmission of vibration to the wall.

Distribution Circuit

The system 10 may include a distribution circuit 90, supported by the support member 20, for distributing both low voltage power and various signals to selected components mounted on or to the support member 20.

The distribution circuit 90 may include an integrated signal and power bus or backplane interconnecting a plurality of spaced apart system devices. The distribution circuit 90 may include one or a series of heavy duty printed circuit boards installed in the lower portion of the support member 20 (e.g., the connectors shown in FIG. 17 connect to the distribution circuit 90). In one embodiment, the distribution circuit 90 includes connections and signal pathways for a variety of signal types including low voltage power, speaker level signals, digital and/or analogue control signals, digital and/or analogue audio and/or video source signals, and Ethernet or other forms of data signals. This arrangement allows the internal devices within the support space 22 supported by the support member 20 to be directly connected to one another through the pathways on the integrated signal and power bus, thus obviating the need for bulky wiring and enabling the full depth of the equipment mounting member to be exploited for mounting internal components, while also reducing the need for interconnection wiring and the risk of devices being connected improperly. Suitable connectors pairs for connecting the power distribution module 50, power amplifier 60 and/or the signal processor 70 to respective points of the distribution circuit 90 may be chosen, for example, from the Samtec™ MPT, MPS, MPTC, and MPSC series of complementary connectors, which may include both straight and right-angled versions of the connectors.

Figure 17:
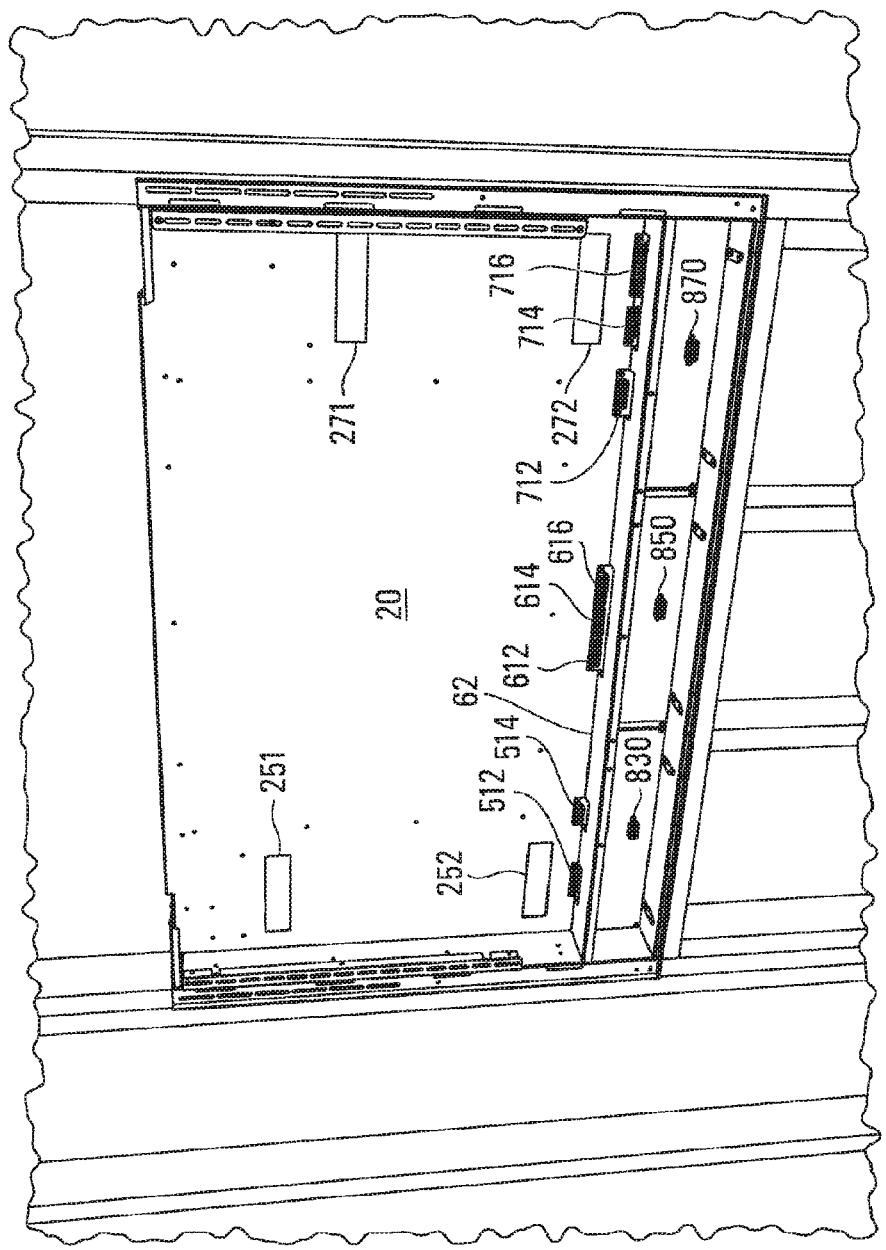
FIG. 17 is a perspective view of the support member according to a different embodiment than that shown in FIG. 4, the support member having a self-aligning mounting mechanism for several modules.

Referring to FIG. 17, a plurality of connectors are mounted adjacent the shelf 62 for interconnecting the power distribution module 50, the multichannel power amplifier 60, and the signal processor 70, through a distribution circuit 90, which may include a backplane implemented using one or more printed circuit boards and mounted to the support member.

Referring now to the connectors mounted above the shelf 62, connector 512 connects the power distribution module 50 to the distribution circuit 90 and connects to the multichannel power amplifier 60 through connector 514 and to the AV signal processor 70 through connector 714. Connector 514 connects the multichannel power amplifier 60 to the distribution circuit and connects low voltage power signals from the power distribution module 50 through connector 512. Connector 714 connects the AV signal processor 70 to the distribution circuit and connects low voltage power signals from the power distribution module 50 through connector 512. In some embodiments, more than one level of low voltage power may be supplied over the distribution circuit.

Connectors 612, 614, and 616 cooperate to connect the multichannel power amplifier 60 to the distribution circuit 90. These connectors carry speaker level audio to the left channel speaker through connector 830, to the center channel speaker through connector 850, to the right channel speaker through connector 870, and to the subwoofer and/or the surround speakers through connector 716 to connections mounted at the top of the signal processor 70 enclosure.

Connector 712 connects the multichannel power amplifier 60 to the distribution circuit, and carries digital control signals as well as digital audio signals from the AV signal processor 70 through connector 714. Connector 714 connects the AV signal processor 70 to the distribution circuit, and carries both digital control signals and digital audio signals to the multichannel power amplifier 60 through connector 712. Connector 716 connects the AV signal processor 70 to the distribution circuit, and carries speaker level audio from the power amplifier 60 through connectors 612, 614 and 616 to the subwoofer and surround speakers at the top of the AV signal processor 70 enclosure.

Referring now to the connectors mounted below the shelf 62, connector 830 connects the left channel speaker to the distribution circuit and carries speaker level audio from the power amplifier 60 through connectors 612, 614, and 616. Connector 850 connects the center channel speaker to the distribution circuit, and carries speaker level audio from the power amplifier 60 through connectors 612, 614 and 616. Connector 870 connects the right channel speaker to the distribution circuit, and carries speaker level audio from the power amplifier 60 through connectors 612, 614 and 616.

Line Voltage Connection Member

Figure 6:
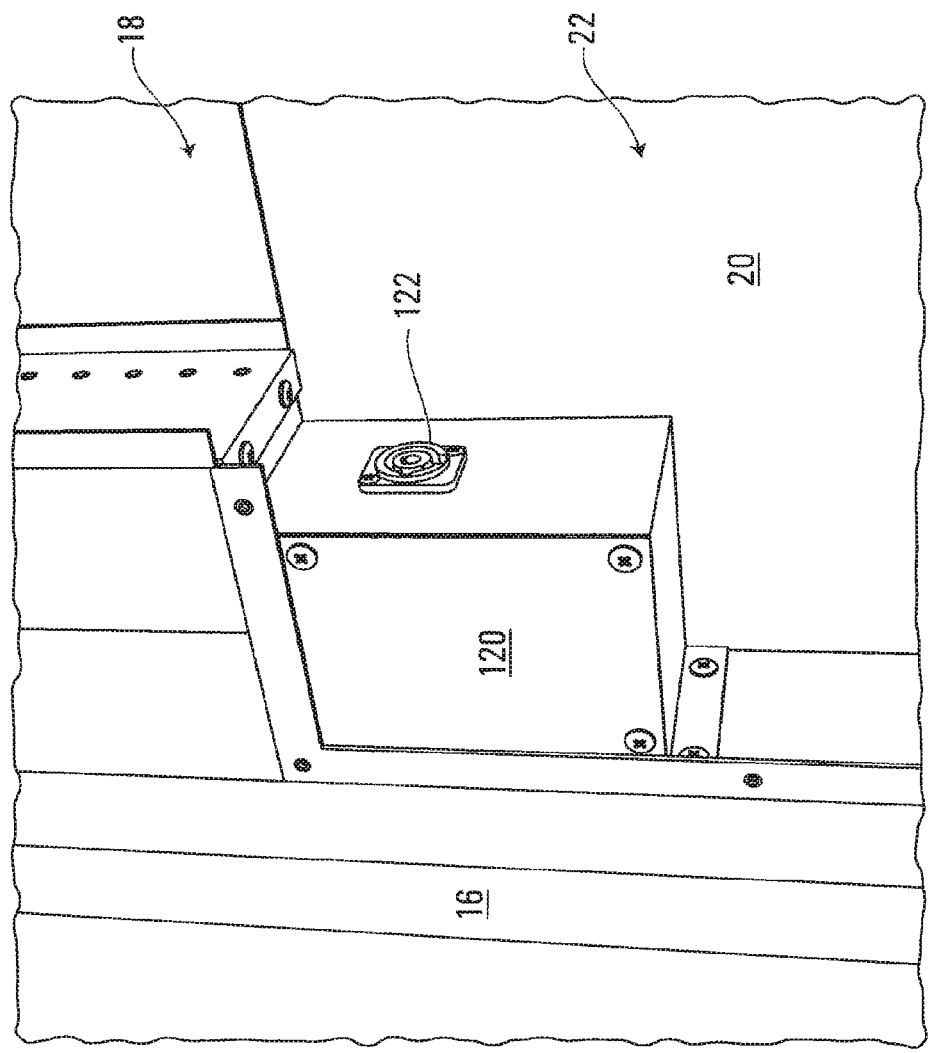
FIG. 6 is a perspective view of a line voltage connection member supported by the support member, connected to a line voltage and configured to provide the line voltage to a locking receptacle operable to engage an electrical cable having a connector complementary to the receptacle to convey the line voltage to a power distribution module.

Referring to FIG. 6, the support member 20 may further include a line voltage connection member 120, located within the support space 22 of the support member 20. In this embodiment, the line voltage connection member 120 may include a metal enclosure with a removable front cover held in place by fasteners such as machine screws. The line voltage connection member 120 provides a dedicated physical location in the support space 22 for termination of line voltage electrical power entering the support member 20 for use by components in the support area. Once the support member 20 has been mounted to the wall support, an electrical contractor can run the required electrical power conductors to this location, and connect them within the enclosure to a line voltage receptacle accessible from an outer surface of the line voltage connection member 120. Once the electrical circuit connection is complete, it can be tested and verified. This allows the electrical contractor to complete his work very early in the construction process and removes the requirement for any further involvement by the electrical contractor in the process of system installation. A power cable can then be connected to the line voltage receptacle and used to provide power to the power distribution module 50, which in turn can provide line and low-voltage power to other components of the system 10.

Low Voltage Connection Member

Figure 7:
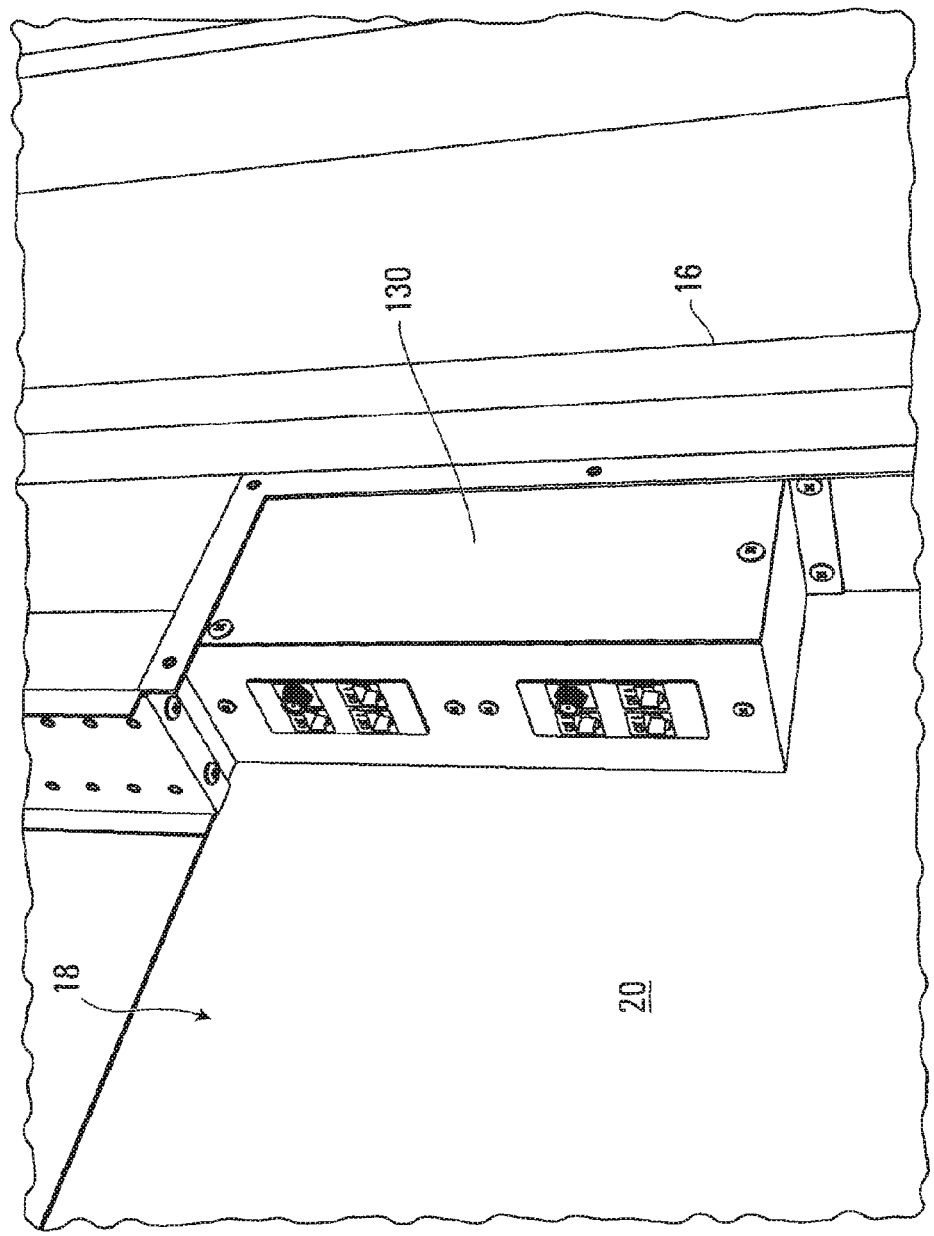
FIG. 7 is a perspective view of the low voltage connection member supported by the support member operable to receive and make a plurality of low-voltage connections especially with respect to the outside world.

Referring to FIG. 7, the support member 20 further includes a low-voltage connection member 130. In this embodiment, the low-voltage connection member 130 is mounted to the support member 20 and includes a metal enclosure with a removable front cover held in place by fasteners such as machine screws. The low-voltage connection member 130 provides a dedicated physical location in the support space 22 for the termination of low-voltage cables and services entering the support member 20. On its outer surface, the enclosure may provide a plurality of low-voltage receptacles and connectors for making low-voltage signal connections. Once the support member 20 has been mounted to the wall support, an electronics systems contractor or other installer can run the required low voltage cables to this location, and make good and test all connections. Alternatively, the contractor or installer may leave the cables coiled for future termination during final installation. This connection member 130 is operatively configured to be used to provide low-voltage signals (including, but not limited to, AV, Data, CATV, Contact Closure, IR/Serial/IP Control. Speaker/Line Level audio) to system components as desired.

Power Distribution Module

Figure 8:
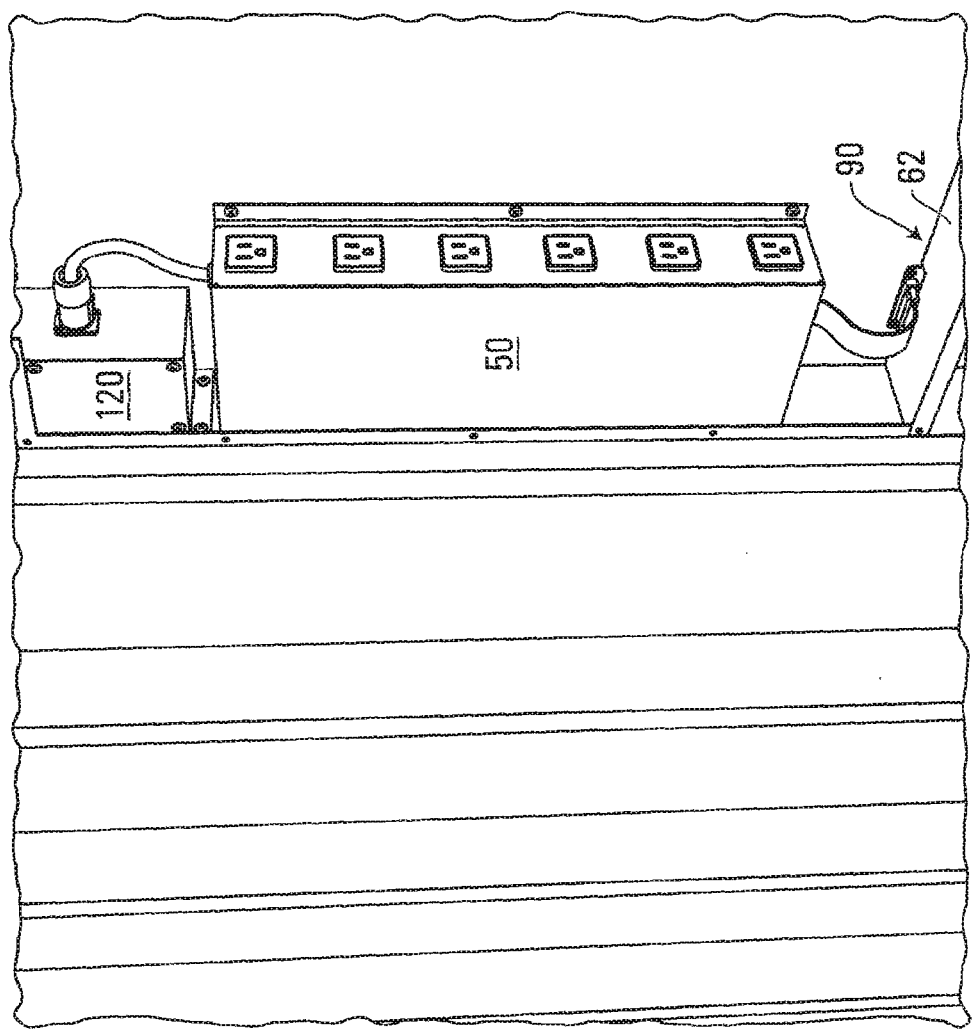
FIG. 8 is a perspective view of a power distribution module receiving a line voltage from the line voltage connection member of FIG. 6.

Referring to FIG. 8, the support member 20 may further support a power distribution module 50. In this embodiment, the power distribution module 50 is a dedicated power distribution and management device located in the support space 22, and mounted to the support member 20 by means of fasteners such as machine screws. The power distribution module 50 includes a dedicated power cable having a plug which provides a locking connection to the line voltage receptacle 122 of the line voltage connection member 120, thereby providing electrical power to the power distribution module 50. In this embodiment, the power distribution module 50 is the sole distribution point of line and low-voltage electrical power within the support space 22. The power distribution module 50 may include a plurality of AC power receptacles (typically 6) spaced apart to support multiple power supply connections, a circuit breaker, a surge suppression circuit providing industrial grade surge protection (e.g., to survive 6000V/3000 A surge pulse events, greater than a thousand times), and low-voltage power distribution for various components. The power distribution module 50 may produce a plurality of different low voltages for different devices.

The power distribution module 50 distributes low-voltage power through a distribution circuit to the multichannel amplifier and the signal processor 70. In one embodiment, the distribution circuit includes a ribbon cable connection from the power distribution module 50 to a complementary connector mounted on the support member 20 and electrically connected to the respective connectors associated with the multichannel amplifier and signal processor 70. In another embodiment, the distribution circuit includes one or more printed circuit boards (PCB's) for transferring low voltage power from the power distribution module 50 to the power amplifier 60 and/or to the signal processor 70.

The power distribution module 50 may be operably configured to monitor voltage and/or amperage for each AC power outlet. If an excessive voltage and/or amperage is detected, the power distribution module 50 may be operably configured to shut down one or more individual AC power outlets and/or to cause a notification to be sent to the owner. Optionally, the power distribution module 50 may provide Web-based power management and control of individual AC receptacles. The power distribution module 50 may cause notifications of unusual power supply events to be sent by email in some embodiments.

Signal Processor/Preamplifier

Figure 9:
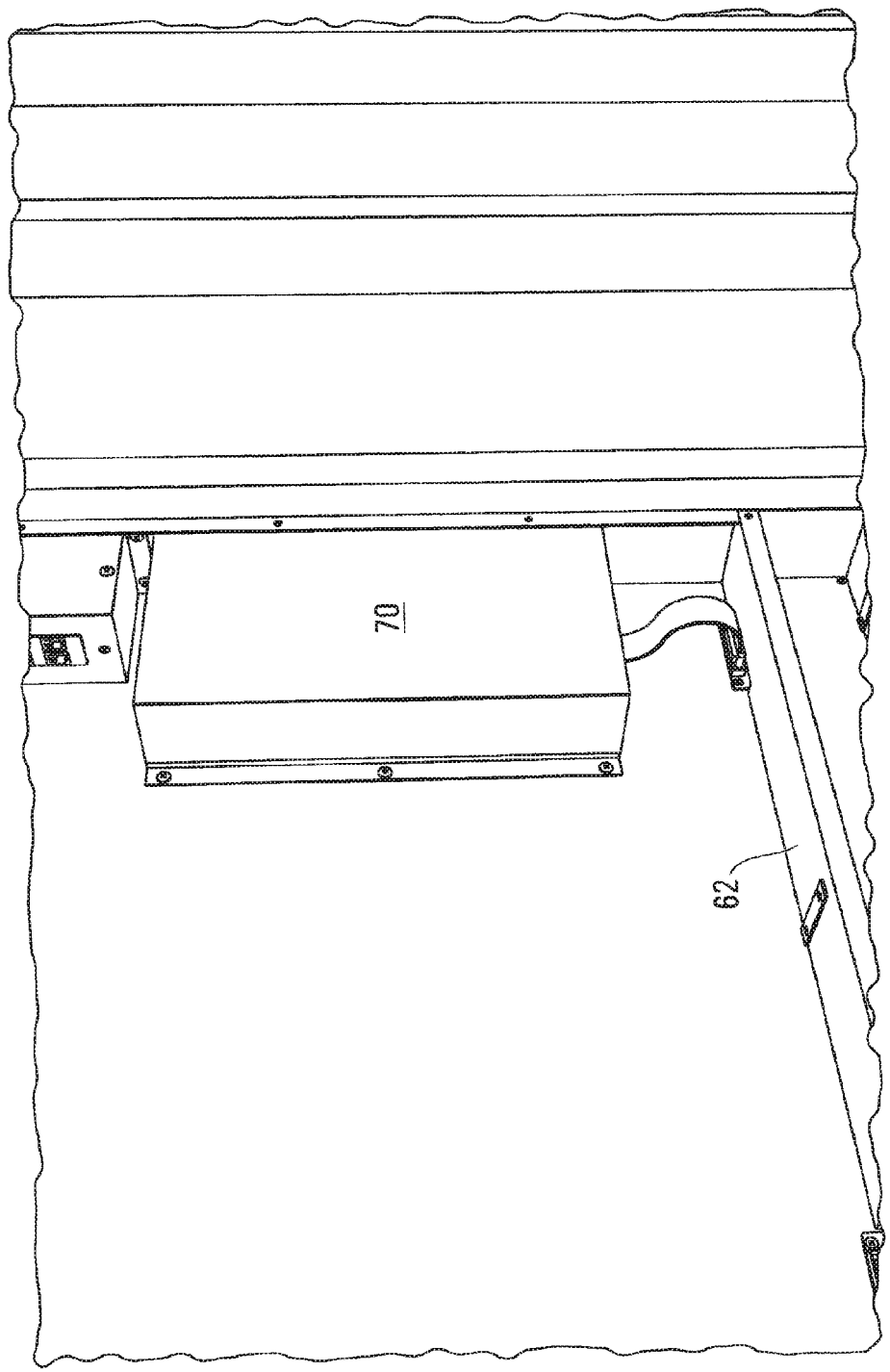
FIG. 9 is a perspective view of one embodiment of an AV signal processor which may include amplification and switching functions, the signal processor being supported by the support member in the in-wall space.

Referring to FIG. 9, the support member 20 may further support an AV processor/preamplifier 70 within the support space 22 and mounted to the support member 20 by means of removable fasteners such as machine screws. In this embodiment, the signal processor 70 receives power through a distribution circuit interconnecting the power distribution module 50 and the signal processor 70. The distribution circuit may include a ribbon cable connected from the signal processor 70 to a suitable connector mounted on the support member 20 and interconnected to a connector associated with the power distribution module 50. The signal processor 70 may also provide signals to the power amplifier 60 and/or the power distribution module 50.

Figure 33:
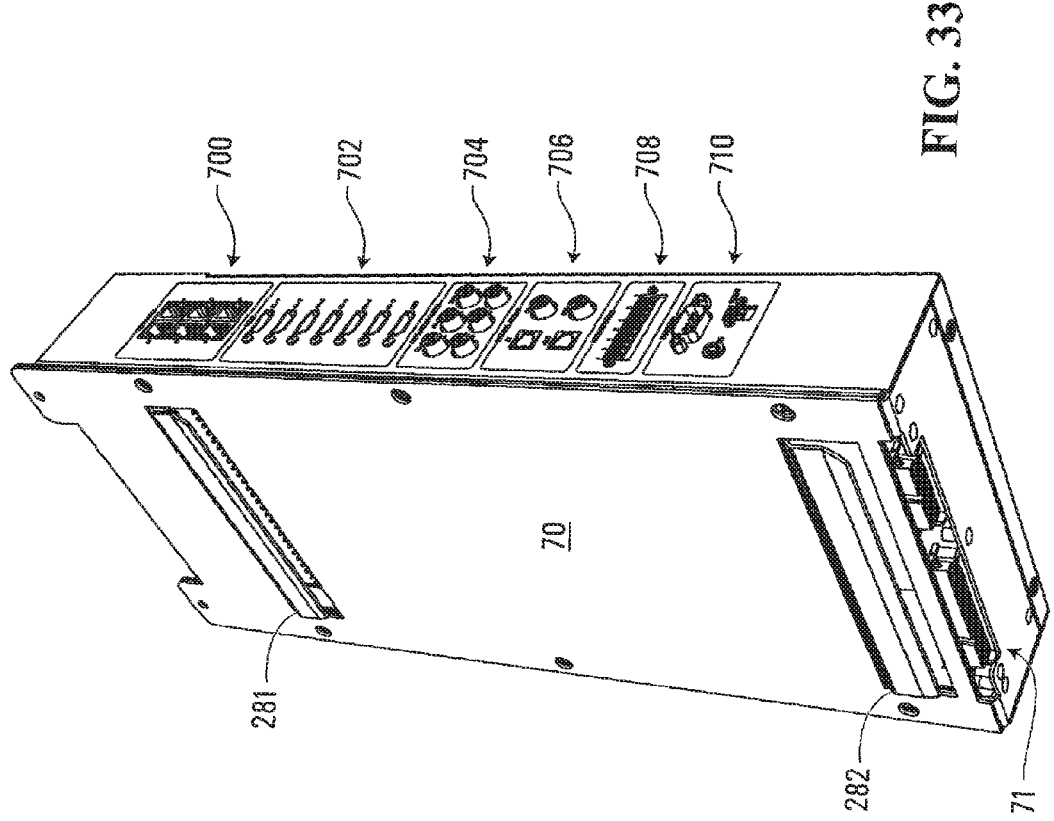
FIG. 33 is a bottom angled perspective view of one embodiment of the signal processor device having a plurality of digital and analog connectors (inputs and outputs) for audio, video, control and/or data signals, the signal processor having a plurality of hangers whereby the signal processor may be automatically aligned while being mounted on the support member, such that one or more connectors on a bottom portion of the signal processor may effectively mate with complementary connectors on the support member.

An alternative embodiment of the signal processor 70 shown in FIG. 33. In this embodiment, the signal processor 70s shown from a rear perspective viewpoint which illustrates that the rear side of the signal processor 70 includes a pair of hangers operatively configured to align the signal processor 70 when it is mounted on the support member 20 such that a plurality of ports are connectors disposed on the bottom portion of the signal processor 70, or precisely aligned with corresponding connectors and ports on the distribution circuit to thereby interconnect the signal processor 70 with all necessary signal and power lines.

Referring to FIG. 33, in this illustrative embodiment, the signal processor 70 includes a plurality of network ports as shown generally at 700 (e.g., one Ethernet input, and five Ethernet outputs, which may be connected to Ethernet switching circuitry), a plurality of digital AV ports as shown generally at 702 (e.g., one HDMI output port and six HDMI input ports, which can be redirected to the HDMI output port, with or without processing), a plurality of analogue audio ports as shown generally at 704 (e.g., analogue audio jacks for two input stereo channels and one output stereo channel), a set of digital audio inputs and outputs as shown generally at 706 (e.g., optical/toslink digital audio connection ports such as S/PDIF), a plurality of microphone input channels as shown generally at 708, and miscellaneous control inputs and outputs including an RS-232 port and optionally a remote control port. The ports may also include a reset switch for resetting the signal processor 70 or another component of the system.

The signal processor 70 may include one or more of the following functions:
- A compact form factor allows placement within the support member 20;
- supports audio configurations for Monaural, 2 channel & 2.1 channel stereo, 3.1 channel and 5.1/7.1 and larger surround configurations;
- audio processing/decoding features may include support for Dolby/DTS/THX and/or other formats;
- Multiple HDMI inputs (e.g., HDMI 1.4, DHCP 2.0 compliant);
- A plurality of analog audio and/or video inputs and outputs;
- pre-amplification circuit is applied to any AV signals which do not have a suitable level for input to the multichannel amplifier;
- IR/Serial and IP control of all functions may be provided for integration with external control systems;
- Full Web-based set-up and control including saving and cloning of configurations may be provided; and
- Managed Ethernet switch may be provided in the signal processor 70.

The signal processor 70 may include integral pathways for routing and distribution of speaker level signals to loudspeakers which are not immediately proximate the multichannel amplifier. For example, the signal processor 70 may receive speaker level signals from the multichannel amplifier via the distribution circuit, and may route these signals to a subwoofer and/or to surround speakers located external to the support space 22. In one embodiment, the subwoofer may be located at the top of the support member 20.

Multi-Channel Power Amplifier

Figure 10:
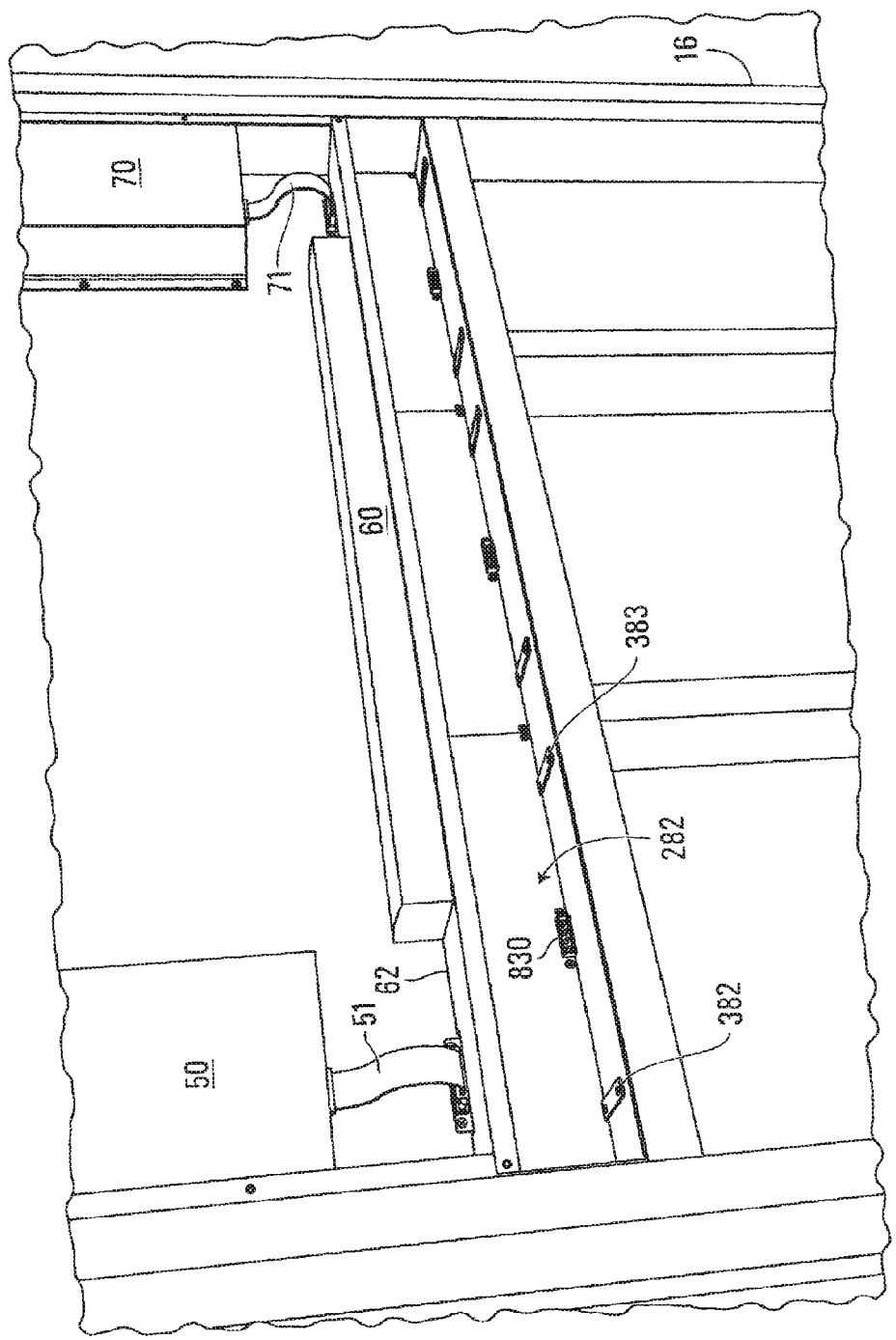
FIG. 10 is a perspective view of a lower portion of the support member, and showing an audio power amplifier interconnected to the power distribution module and the signal processor via a common distribution circuit.

Referring to FIG. 10, the support member 20 may further support a multichannel power amplifier 60 in the support space 22. In this embodiment, the power amplifier 60 delivers a combination of audio quality, output power, efficiency and reliability to ensure an impressive entertainment experience.

As shown in FIG. 10, the power amplifier 60 may have a compact elongate form factor allowing placement of the amplifier in a narrow space adjacent a plurality of loudspeakers. In contrast to some other AV receiver devices, which provide power amplification circuitry adjacent to a plurality of AV input/output ports and/or signal processing circuitry, the present embodiment separates the input and processing of AV device signals into a signal stage (carried out in the signal processor 70) and a power amplification stage (carried out in the power amplifier 60), which are spaced apart and communicate with each other over a distribution circuit including a signal backplane. Because all of the bulky AV input/output ports and most, if not all, of the electronic hardware associated with AV signal processing is located in the signal processor 70 and not the spaced apart power amplifier 60, it is possible to avoid making the power stage bulky. By separating out the signal stage from the power stage in this way, it is possible to fit the power amplifier 60 into a relatively thin, elongate form factor as shown. In some embodiments, the power amplifier 60 may include hardware for digital signal processing relating to speaker-related cross-over calculations and frequency equalization, which does not add much bulk.

Thus, the power amplifier 60 can provide a high total power output for its size at a low power consumption and low operating temperatures. The power amplifier 60 may have a modular design operably configured to allow different number of output channels to be configured on a per system basis. In some embodiments, all power, audio, control and speaker level signals of the power amplifier 80 are connected via the distribution circuit, which may include an integrated signal and power bus. For example, the power amplifier 60 may include a connector operable to interface with a complementary connector on the support member 20 and connected via the distribution circuit to the power distribution module 50, the signal processor 70, and a plurality of loudspeakers.

LCR Loudspeakers 80

The system 10 further includes a plurality of loudspeakers supported by the support member 20 in the support space 22. Referring to FIG. 11, in some embodiments, the system 10 includes left, center and right loudspeakers 82, 84, 86 (i.e., LCR speakers 80) which may be located at respective left, center and right positions in the support space 22. For example, the speakers 80 may be mounted in a horizontal configuration towards a bottom side of the support member 20. In one embodiment, the LCR loudspeakers 80 include speakers each having a slot. The LCR loudspeakers 80 are positioned and oriented to direct sound waves toward a viewer generally located in front of the display device 40.

The LCR loudspeakers 80 will remain completely concealed behind a support space cover 100 when the system 10 is fully installed and in operation. In embodiments where the cover 100 includes a fabric transparent to audio waves (i.e., an acoustically-transparent fabric), the audio from the LCR loudspeakers 80 will pass through the cover 100 just below the display device 40 with a minimum of interference. The LCR loudspeakers 80 may include an integral connector designed to mate with a complementary connector located on a rear surface of the support member 20. The connections provided through the respective connectors provide speaker level audio to each of the LCR loudspeakers 80. The LCR loudspeakers 80 may also include a positioning system operatively configured to ensure that, when the LCR loudspeakers 80 are being inserted, the connectors on the speaker and on the support member 20 are precisely aligned to ensure a correct and positive connection. This arrangement removes the requirement for a more standard "wired" connection between the power amplifier 60 and the LCR loudspeakers 80 and furthermore, reduces the possibility of the loudspeakers being wired incorrectly. Suitable complementary connectors for making such a connection between the loudspeakers and the distribution circuit may include Samtec™ MPT and MPS series header/socket connectors.

Figure 28:
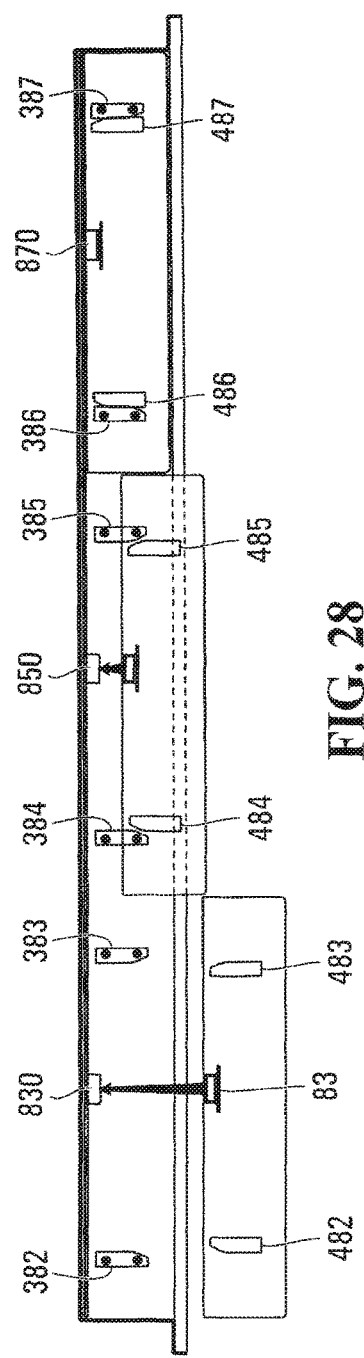
FIG. 28 is a top sectional view of a plurality of receptacles of the support member in the process of receiving left, right and center speaker enclosures, respectively, into a mounted position.
Figure 29:
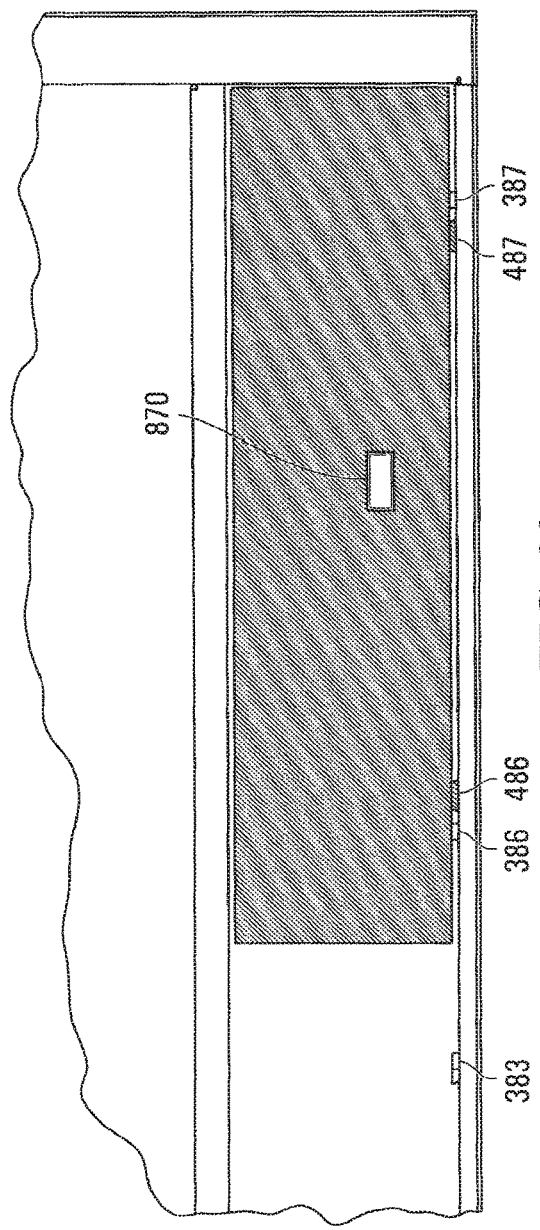
FIG. 29 is an enlarged partial front sectional view of one of the receptacles and showing an audio connector at the rear of the receptacle, FIGS. 28 and 29 together illustrating a self-alignment mechanism whereby movement of the enclosures into the receptacles along a first axis, causes automatic alignment along a second axis with an audio signal connector at the rear of the receptacle in response to deflection from two spaced apart guide members, and whereby the guide members each include a locking surface for engaging a complementary locking surface on the enclosures to lock the speakers against movement along a third axis, wherein the first, second and third axes are orthogonal to each other.

FIG. 28 is a top sectional view of a plurality of receptacles (shown as 282, 284, 286 in corresponding portions of FIG. 4) of the support member 20 in the process of receiving left, right and center speaker enclosures 82, 84, 86, respectively, into a mounted position, and FIG. 29 is an enlarged partial front sectional view of one of the receptacles and showing an audio connector at the rear of the receptacle. FIGS. 28 and 29 together illustrate a self-alignment mechanism whereby movement of the enclosures into the receptacles along a first axis, causes automatic alignment along a second axis with an audio signal connector at the rear of the receptacle in response to deflection from two spaced apart guide members. The guide members each include a locking surface for engaging a complementary locking surface on the enclosures to lock the speakers against movement along a third axis, the first, second and third axes being mutually orthogonal.

Figure 32:
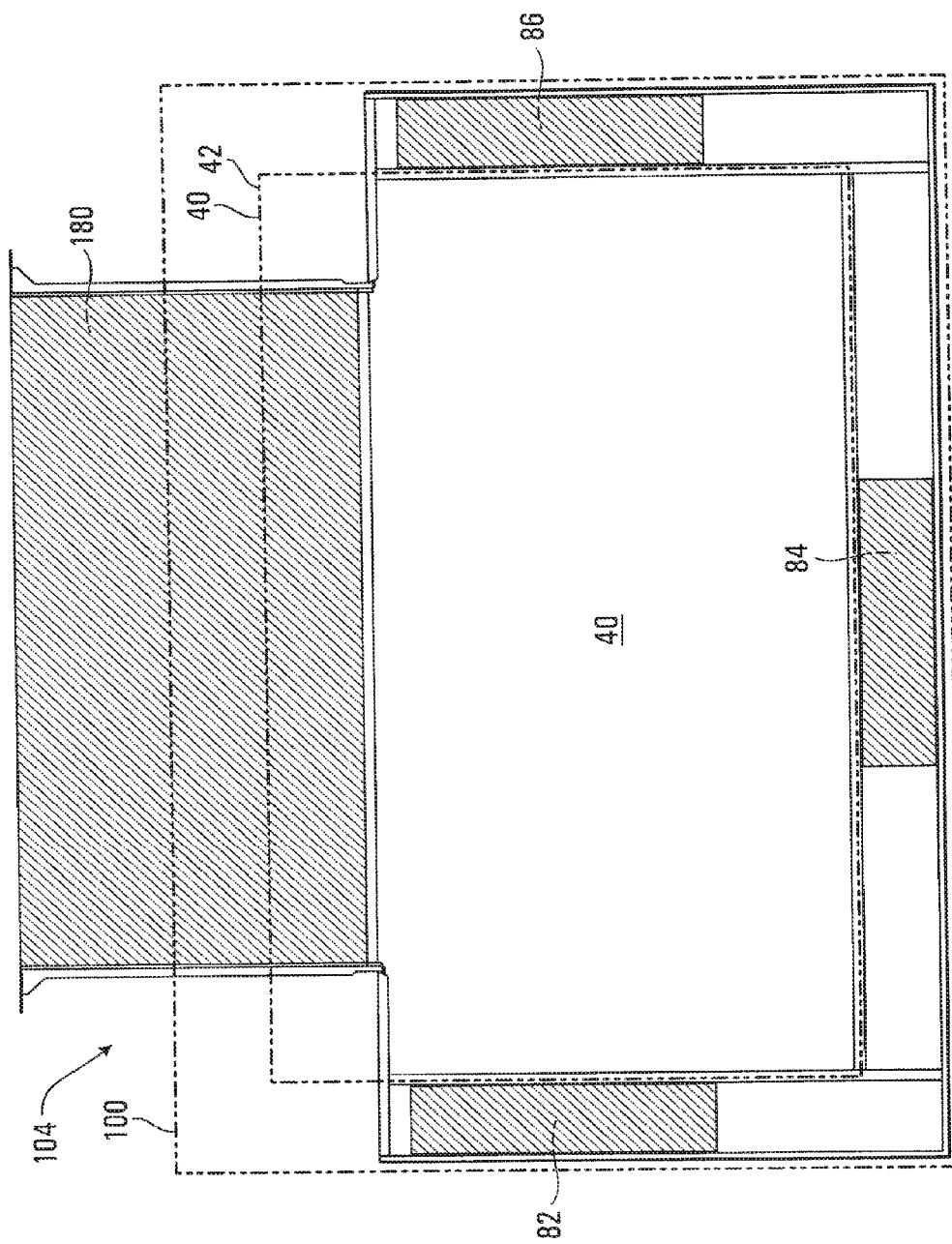
FIG. 32 is a front view of an alternate embodiment of the support member with a different arrangement of the speakers, namely, with the left and right speakers respectively disposed to the left and right of the display device position when pointed, and including a cover dimensioned and positioned to cover and conceal anything visible in the in-wall space including the speakers.

FIG. 32 shows an alternative embodiment in which the left and right speakers 82, 84 have been moved horizontally such that they no longer abut the center speaker 84. In this embodiment, better stereo separation is achieved by horizontally placing the left and right speakers 82, 84 to the left and right of the display device 40, respectively, as viewed from a direct viewing position. As above, the loudspeakers are embedded in the wall and are covered by a wall opening cover 100 disposed in a plane rearward of the plane of the display device 40.

Subwoofer Loudspeaker

Figure 12:
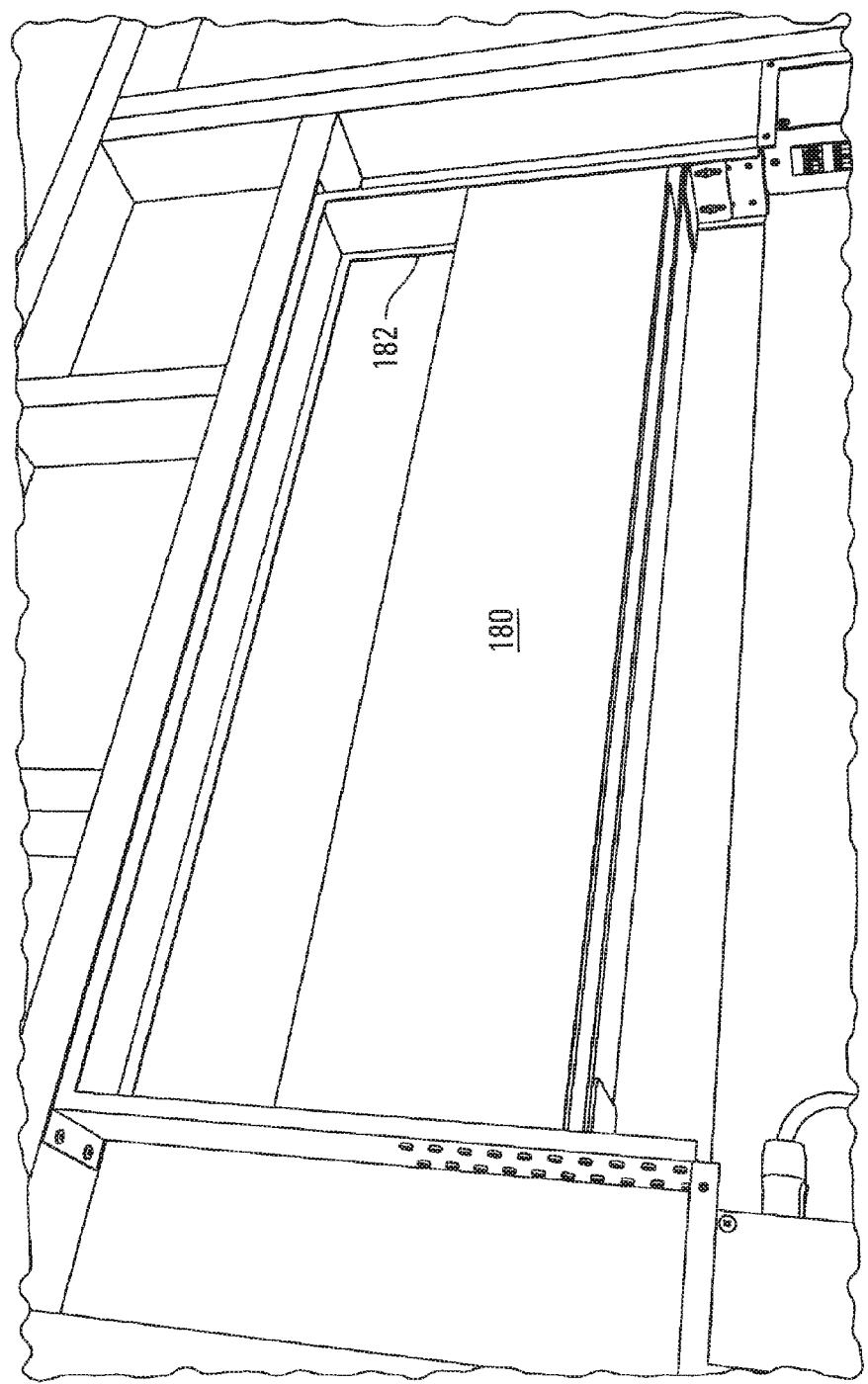
FIG. 12 is a perspective view of the top portion of the support member for their showing a subwoofer enclosure that has been removably installed in the subwoofer mount and position to a particular vertical position.

The system 10 may include a compact, positionable subwoofer loudspeaker located within the wall space. Referring to FIG. 12, a subwoofer loudspeaker according to one embodiment is shown being supported by the support member 20 in a portion of the support space 22 located directly above the support member 20. The subwoofer loudspeaker includes a subwoofer enclosure and one or more physical subwoofer drivers.

In embodiments such as the one shown in FIG. 12, the physical subwoofer drivers are mounted entirely within the subwoofer enclosure and are not exposed or visible on any exterior surface. This configuration causes all of the subwoofer sound to exit the enclosure through a narrow horizontal opening, which may be located along the lower edge of the enclosure or on another face of the enclosure. The subwoofer opening may be positioned proximate to an edge of the display device 40. The precise position of the opening in the face of the enclosure may be customized for each installation based on the relative sizes of the display device 40 and/or the cover 100. In the embodiment shown in FIG. 12, the enclosure is to be positioned at a position above and adjacent to a top edge of the display device 40. This allows the subwoofer audio to pass through the cover 100 just above the display device 40 with no visible sign of where the sound is coming from.

In alternative embodiments, the subwoofer drivers may be visible on an exterior surface of the enclosure. In such cases, the openings of the subwoofer drivers may be positioned in a clear line of sight to the viewer to avoid the sound waves having to traverse around the display device 40. In some embodiments, the openings of the subwoofer drivers may have a partially clear line of sight to the viewer. Despite the clear or partially clear line of sight of the subwoofers to the viewer, the viewer will be unable to view the subwoofer loudspeaker in this embodiment once the system 10 is fully installed, since the subwoofers will be concealed by a cover 100. In still other embodiments, the subwoofer may be placed behind the display device 40, but within the wall space.

As shown in FIG. 12, the subwoofer enclosure may be removably received in a channel formed by first and second opposite guides, for example, first and second sides of the mounting bracket. The guides may include a plurality of affixing points at different positions, for example, a plurality of openings through which at least one fastener may be inserted through the guide into the subwoofer enclosure to affix it in a particular position. Thus, the subwoofer enclosure may be positionable and removably mounted at any one of a plurality of positions within the guides in order to position an opening of the subwoofer enclosure in a line of sight to the viewer to reduce obstruction of the sound by the display device 40. In FIGS. 5 and 12, the subwoofer is vertically positionable. Alternatively, or in addition, the subwoofer may be horizontally positionable in some embodiments.

Equipment Mounting Member

Figure 13:
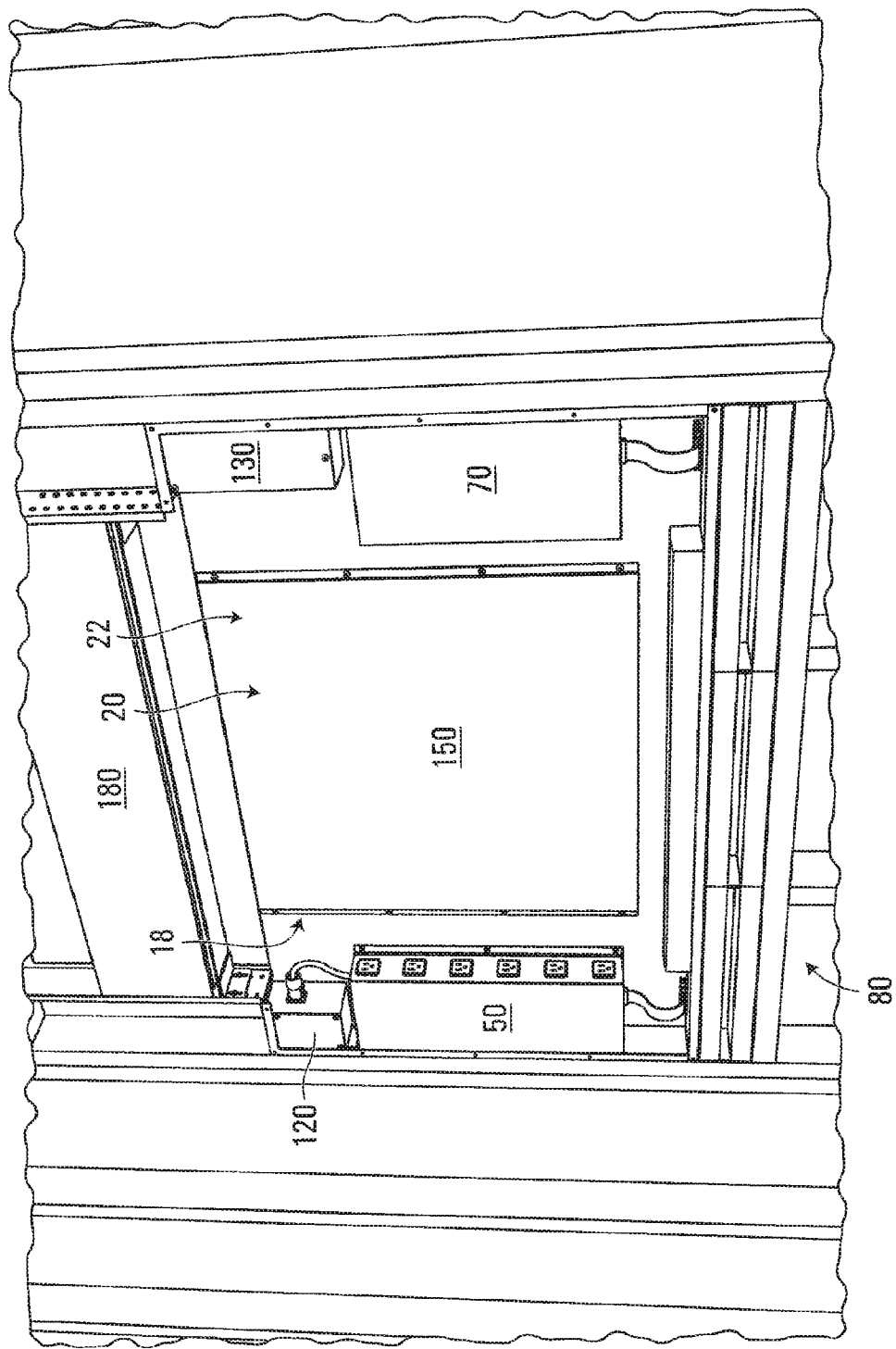
FIG. 13 is a perspective view of the support member having the aforesaid components attached thereto and also having an equipment mounting member mounting a plurality of components and devices in a support space of the support number.
Figure 19:
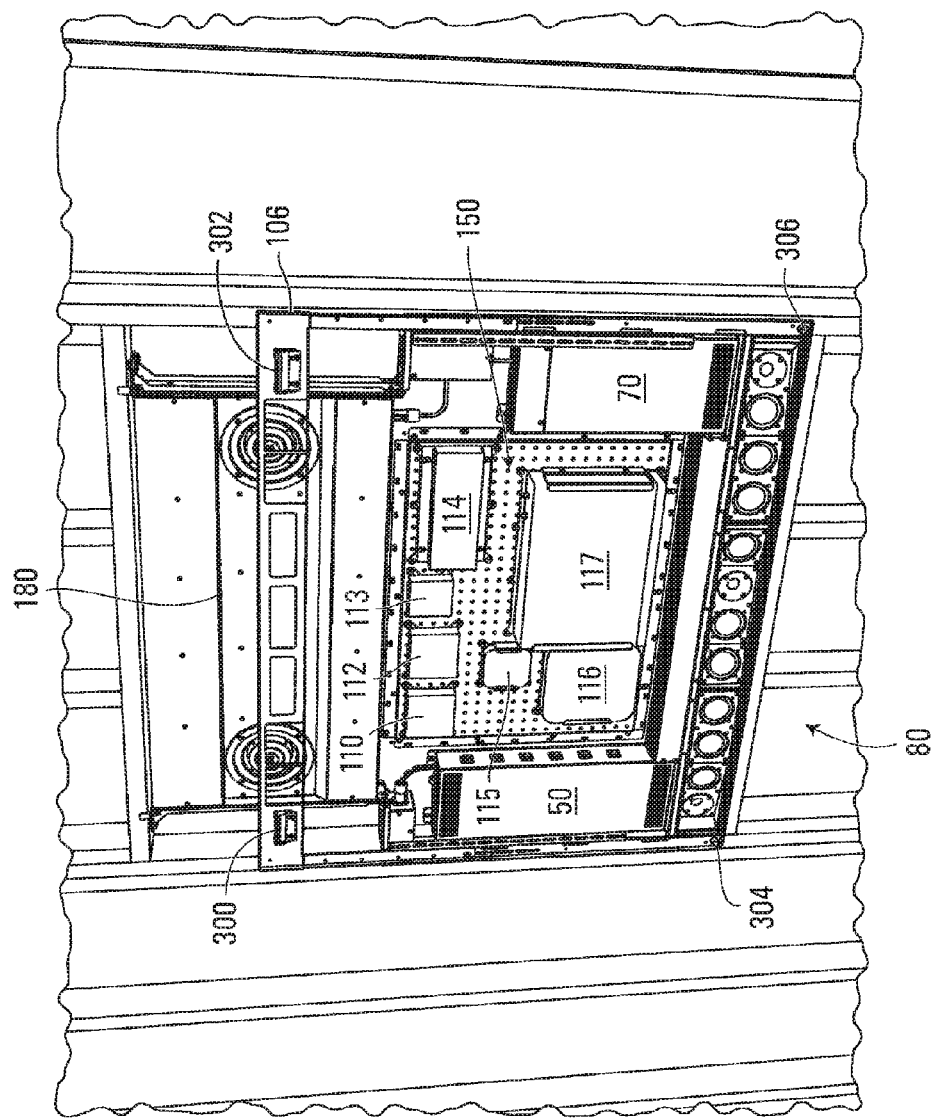
FIG. 19 is a perspective view of the support member of FIG. 17 further populated with additional components in the support space, including a plurality of AV signal sources, communication and computing equipment, mounted in the middle portion of the support space, FIG. 19 also illustrating further embodiments of a subwoofer enclosure and a wall surface interface member.

The system 10 may further include an equipment mounting member 150 affixed to or integral with the support member 20. Referring to FIG. 13, an equipment mounting member 150 according to one embodiment is shown affixed inside the support member 20 and securely mounted thereto using fasteners such as machine screws. The equipment mounting member 150 is operably configured to removably mount various AV signal source devices that will be held in the support space 22. Different AV source will be mounted to the equipment mounting member 150 depending on user-desired installation features and functionality. Examples of common AV signal source devices include cable TV set-top boxes, satellite receivers, AppleTV® devices, steaming media players, small form factor personal computers and other similar AV source components. The equipment mounting member 150 can optionally also provide a mounting surface and location for balun-based systems (active and/or passive) used to extend AV signals (including HDMI) from remotely located AV source devices such as DVD, CD and/or Blu-Ray Disc players located externally to the support space 22. Data communication, computing and networking equipment (e.g., Internet routers or modems), may also be removably mounted on the equipment mounting member 150 in the support space 22. For example, in the exemplary embodiment shown in FIG. 19, the mounted devices include dual Gefen™ HDMI extenders (fiber), a Gefen™ HDMI extender (CAT-6), an RTI™ XP-6 Controller (i.e., a remote control processor operable to communicate with a remote control and to control the AV system in response to user commands), an AppleTV™ device, an Apple Mac Mini™, and a Motorola™ high definition personal video recorder (PVR).

In this embodiment, the equipment mounting member 150 is removable and is operably configured to removably mount both universal and device-specific mounting brackets for use in mounting the devices such as those described above. The equipment mounting member 150 may include a plurality of integrated affixing points (e.g., a plurality of spaced-apart openings or dips) for mounting the brackets and/or for managing wiring. Advantageously, any equipment that is mounted on the equipment mounting member 150 is located proximate the display device 40 and thus can easily be configured to communicate with the display device 40 (whether by wired or wireless connection), but it does not occupy any space in the room. Also, equipment in the in-wall space 18 is not visible to a viewer of the display device 40 because a view of these components is obstructed by the display device 40 and/or the wall opening cover 100 when mounted.

Wall Surface Interface Member

Figure 14:
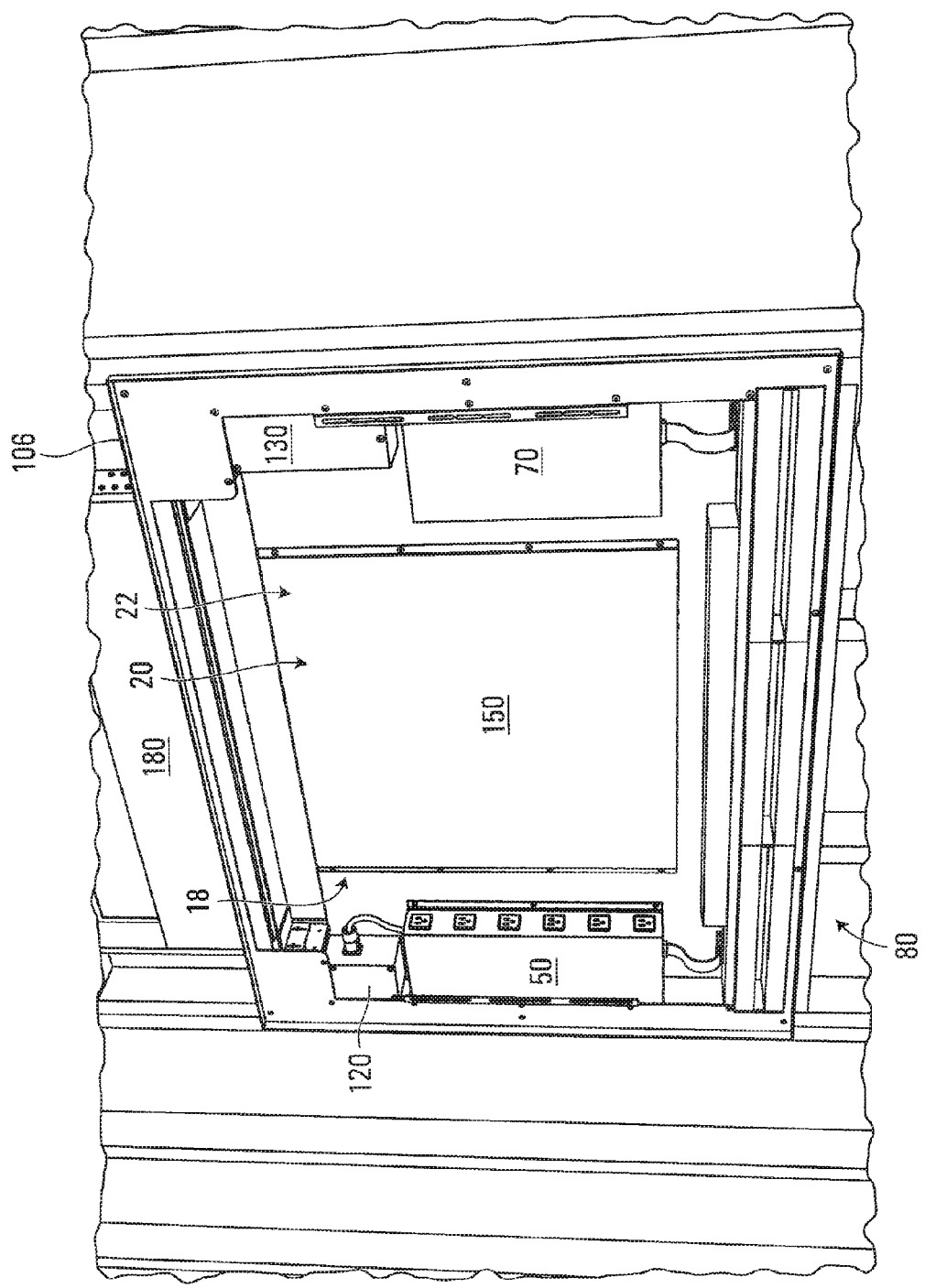
FIG. 14, is a perspective view of the support member of FIG. 13 and further including a wall surface interface member affixed to the front surface of the support member, the wall surface interface member defining a substantial portion of an outer periphery of the apparatus in the wall with respect to the wall surface.

The system 10 may include a wall surface interface member 106 operably configured to provide an interface for a finished wall surface that is to be installed around the wall opening. In other words, the wall surface interface member 106 serves to define the periphery, and thus the overall footprint, of the mounting apparatus 12 in the wall. Referring to FIG. 14, one embodiment of a wall interface is shown at 106. The wall surface interface is operably configured to provide an attractive, permanent, fixed and continuous border defining the external physical dimensions of the system 10 on the finished wall surface. This border serves as a transition point, or "interface," between the mounting apparatus 12 and the material used as the final wall surface, most typically, but not exclusively, gypsum wallboard (G.W.B.) or drywall. In this embodiment, the wall surface interface includes a metal lip at a peripheral edge of the interface to provide a solid and robust surface for the final wall surface to run up to and abut.

In some embodiments, at least part of the interface may be provided by a peripheral portion of the support member 20, for example, by specially formed edges of the box-shaped frame of the support member 20. In some embodiments, the wall surface interface may include integral mounting points, such as threaded or unthreaded affixing points, for the display mounting member 30 and/or the wall opening cover 100. In some embodiments, the wall surface interface may be part of the support member 20, or alternatively, it may be a separate piece removably mounted to the support member 20 as part of the mounting apparatus 12. In one embodiment, the wall surface interface may be affixed to a front surface of the support member 20 by the use of fasteners such as machine screws.

The wall surface interface may be positionally adjustable in at least one dimension. For example, the interface may be vertically adjustable to support forming a wall opening of various sizes in the vertical dimension to allow for proper positioning of the height of the apparatus 12/wall boundary (i.e., the point at which mounting apparatus 12 ends and the finished wall surface begins) for a particular size of display device 40 and wall opening cover 100 used in a given installation. In some embodiments, the interface instead may be adjustable in a horizontal direction to adjust the horizontal width of a final wall opening that will be formed around the installation. In still other embodiments, the interface member 106 may be adjustable in both a horizontal and a vertical direction, such that the footprint of the wall opening in the finished wall surface is adjusted in both the horizontal and vertical dimensions by moving the interface member.

In this embodiment, the wall surface interface includes openings configured to align with the horizontal openings in the subwoofer. The wall surface interface member 106 includes at least one interface opening configured to align with an inner opening in the wall opening cover 100, to provide an unimpeded output path for sound waves emanating from the in-wall subwoofer. At least a portion of the display mounting member 30 may extend through the opening to facilitate mounting the display device 40 externally.

Protective Cover

Figure 20:
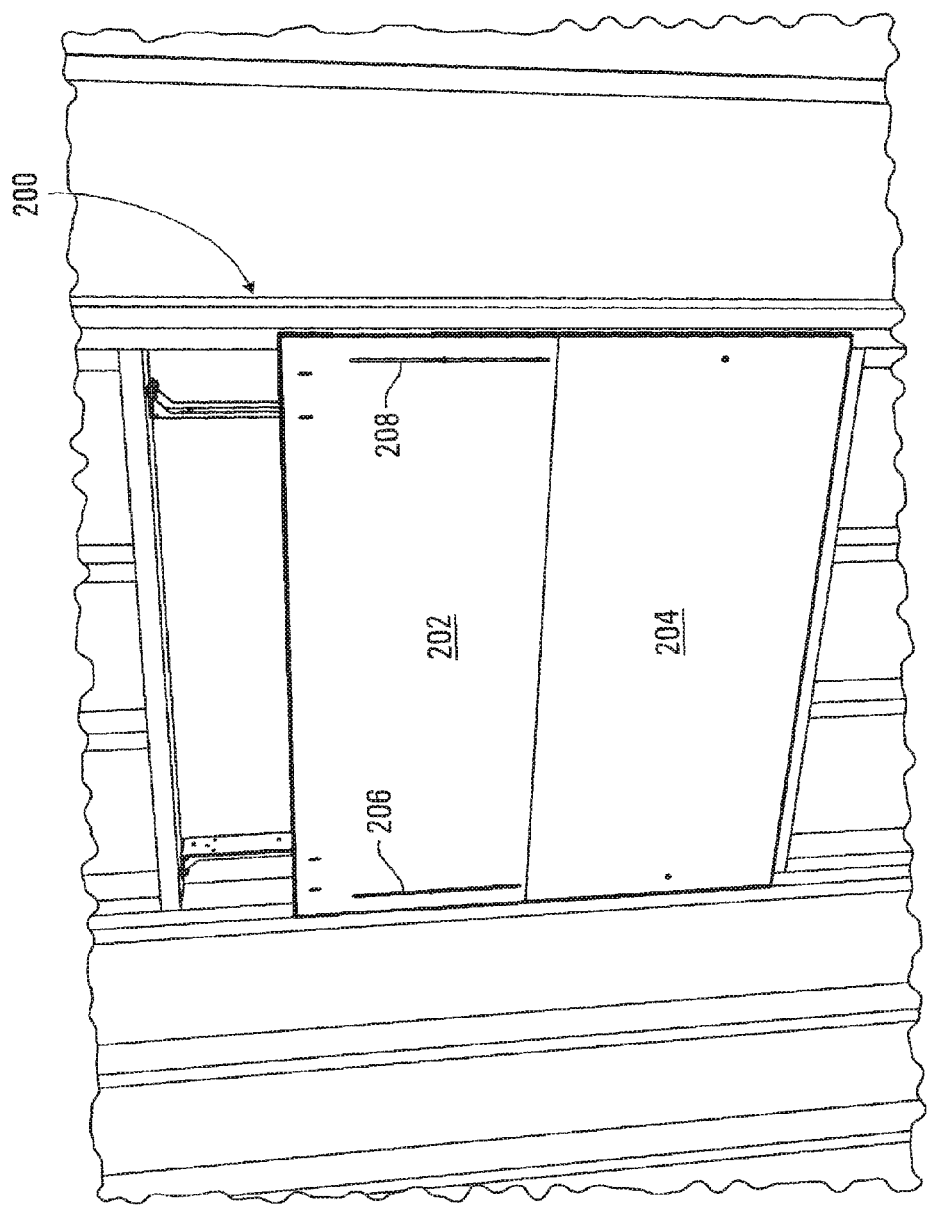
FIG. 20 is a perspective view of the support member being covered by a protective cover intended for use while the apparatus and wall surface are being installed, the protective cover being slidingly expandable to cover a range of sizes of the support space (which is varied based on the size of the display device), the protective cover being attached to the wall surface interface member.
Figure 21:
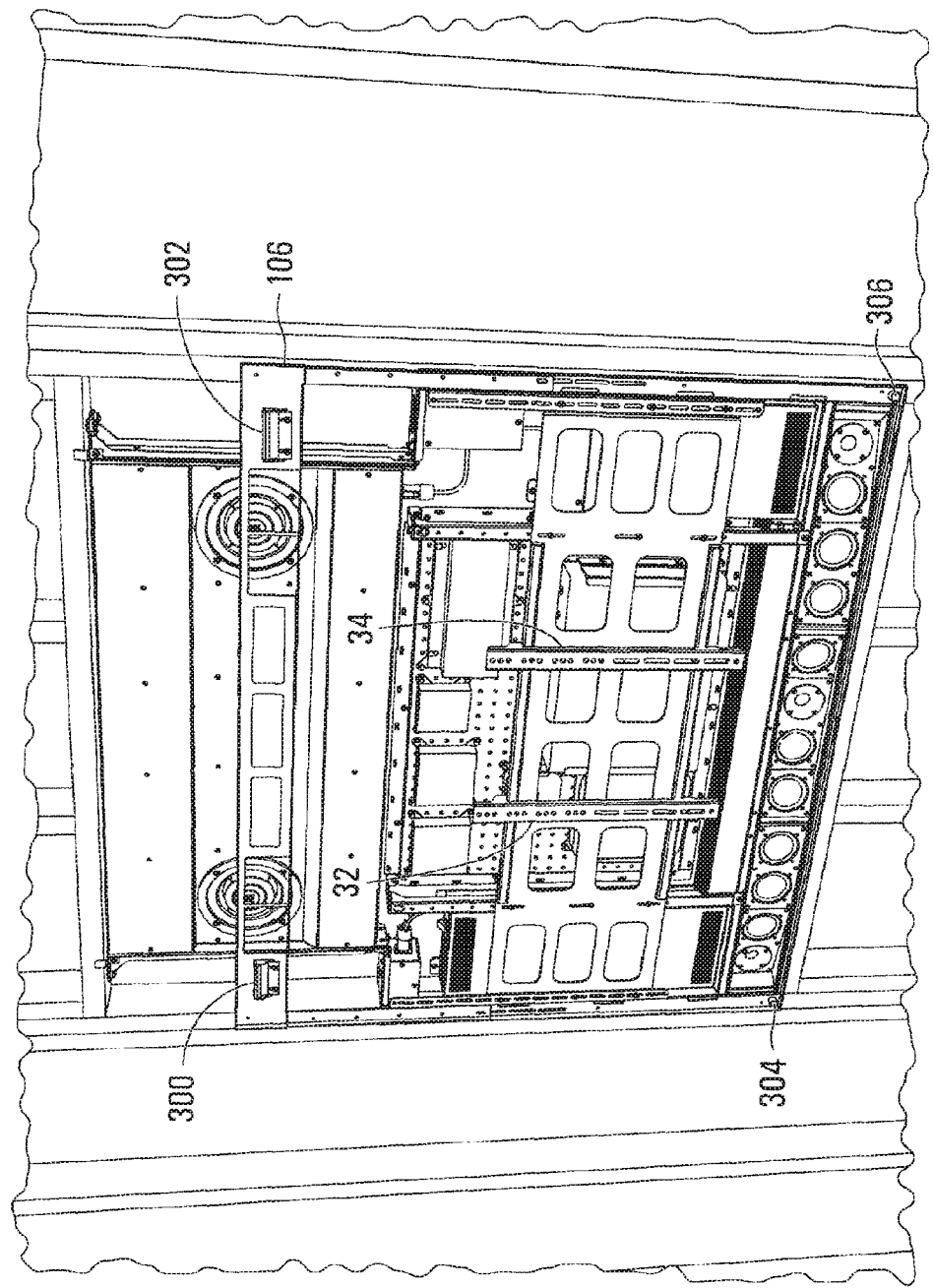
FIG. 21 is a perspective view of the support space when populated with many components and devices, the support space including a display device mounting member including vertical hangers cooperatively configured to facilitate precise mounting of the display device throughout a range of horizontal and vertical positions such that the display device is centered relative to the wall opening cover (which is mounted prior to the display device being mounted)

Referring to FIG. 20, a protective cover system 200 may be provided in accordance with one embodiment, to provide temporary physical protection to the interior of the support member 20 prior to the final installation of all internal components. Once the surrounding wall surface has been repaired, mudded, sanded, and painted, as needed, the cover system may be removed. The cover system may simply use a different size single-piece cover for differently sized installations. Alternatively, the protective cover system 200 may be provided as a two piece system operably configured to protect the system for a range of different size wall openings. The protective cover system includes an upper cover 202 configured to protect the top part of the support member 20 and support space 22, and a lower cover 204 configured to protect the bottom part of the support member 20 and support space 22. The upper and lower covers 202, 204 can be slid apart in a vertical direction to either expand or contract the overall footprint of the protected area. FIG. 20 illustrates that the upper cover can be slid up and down relative to the lower cover, and the relative positions of the two covers can be fixed by tightening a screw. The entire cover is then mounted using further screw holes to the wall surface interface member 106.

Display Mounting Member

Figure 15:
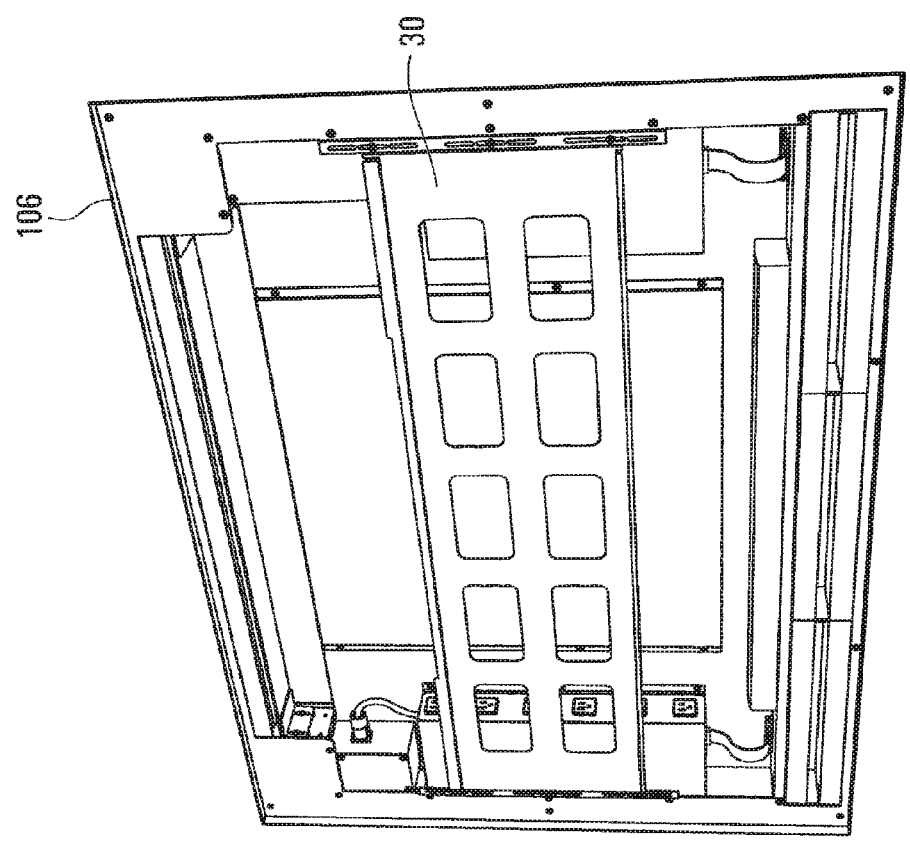
FIG. 15 is a perspective view of the sport member of FIG. 14 and further including a display mounting member for mounting a display device and position and plane outside of and spaced part from the plane of the outer surface of the wall in which the apparatus is installed.

The system 10 and apparatus 12 include a display mounting member 30 operably configured to facilitate mounting of a display device 40 (e.g., TV) to the support member 20, and hence, to the wall support. One embodiment of the display mounting member 30 is shown in FIG. 15. In this embodiment, the display mounting member 30 may be affixed to the wall surface interface using fasteners such as machine screws. The display mounting member 30 may include a metal bracket operably configured to support the display device 40. The display mounting member 30 is operably configured to support the display device 40 in a display mounting position located outside of the wall and in front of the support member 20 such that the display device 40 is spaced apart from the wall, spaced apart from the wall opening cover 100, and located in a plane that is substantially parallel to both the wall and the wall opening cover 100.

The display mounting member 30 is operably configured to allow vertical and horizontal adjustment of position such that the final position of the display device 40 mounted to the display mounting member 30 can be adjusted both vertically and horizontally, thus allowing precise placement (e.g., centering) of the display device 40 in front of the wall opening cover 100. In one embodiment, the display mounting member 30 includes a first plurality of openings aligned to correspond with a corresponding second plurality of mounting openings in a display mounting member 30 interface portion of the support member 20. One of more fasteners may be inserted through the first and second plurality of openings to prevent relative movement between them display mounting member 30 and the display mounting member 30 interface portion, once the display mounting member 30 has been moved into a desired position. In the embodiment shown in FIG. 15, the display mounting member 30 includes a display mounting bracket having a plurality of openings operably configured to correspond to a corresponding plurality of mounting slots in the wall surface interface, which is integral with or removably mounted to the support member 20.

In this embodiment, the bracket has a very shallow profile thereby allowing the display device 40 to sit nearly flush with the wall opening cover 100. The display mounting member 30 may include at least one cable management opening and affixing points to ensure that cabling from within the support space 22 can be run to the display device 40 in a concealed fashion. The display mounting member 30 may include at least one ventilation opening operably configured to improve air circulation within the support space 22 to support passive cooling of the internal components within the support space 22. In some embodiments, the display mounting member 30 is operable to leave as open more than half of the area in a vertical plane to facilitate cable management and cooling.

Display Mounting Hangers

Figure 22:
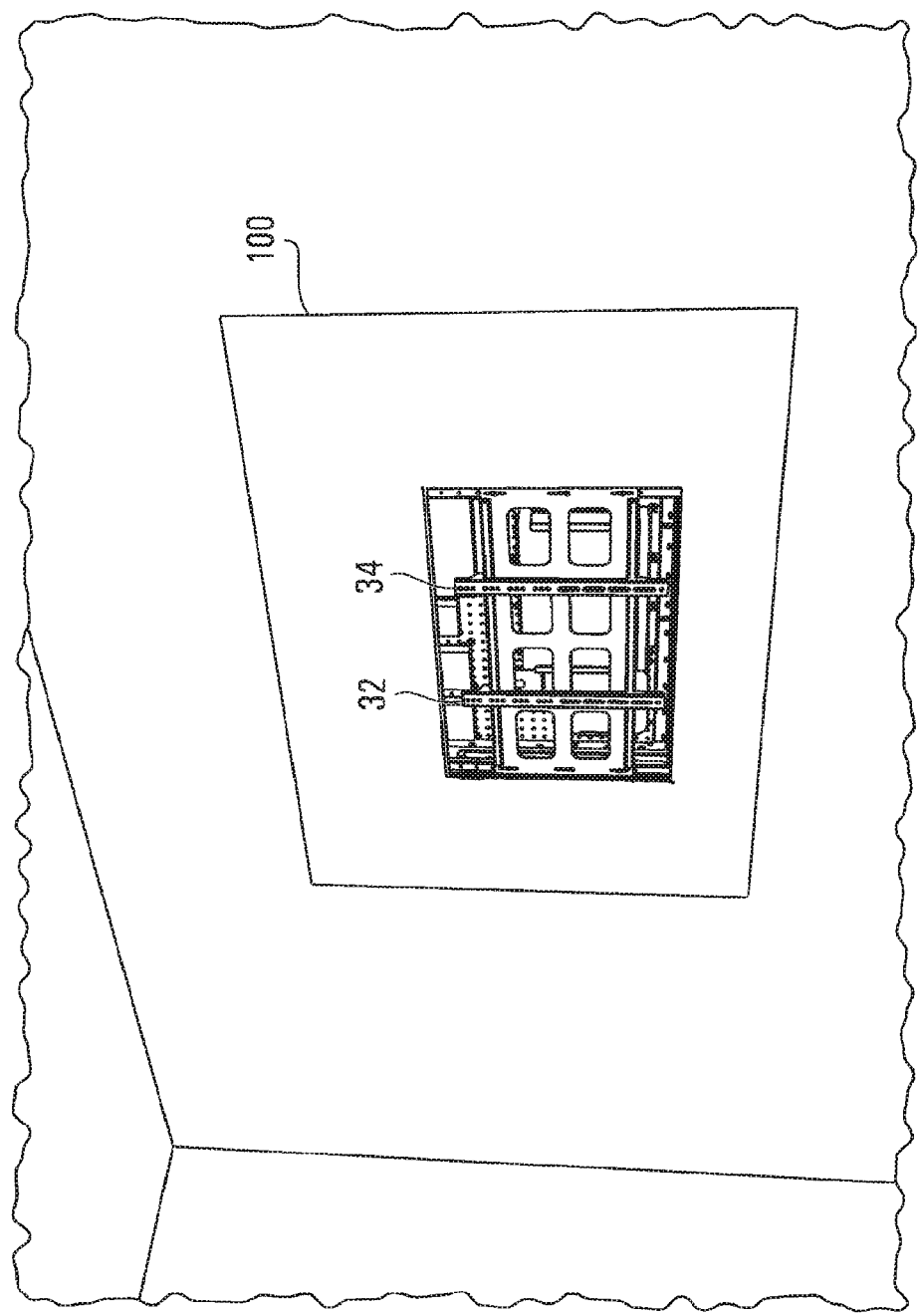
FIG. 22 is a perspective view of the embodiment of FIG. 21 after the wall opening cover is installed by hanging it on the wall surface interface member using a combination of French cleats (to hang the top portion of the cover) and magnetic attachment to a variable depth spacer on the support member (to fix the bottom portion of the cover)
Figure 23:
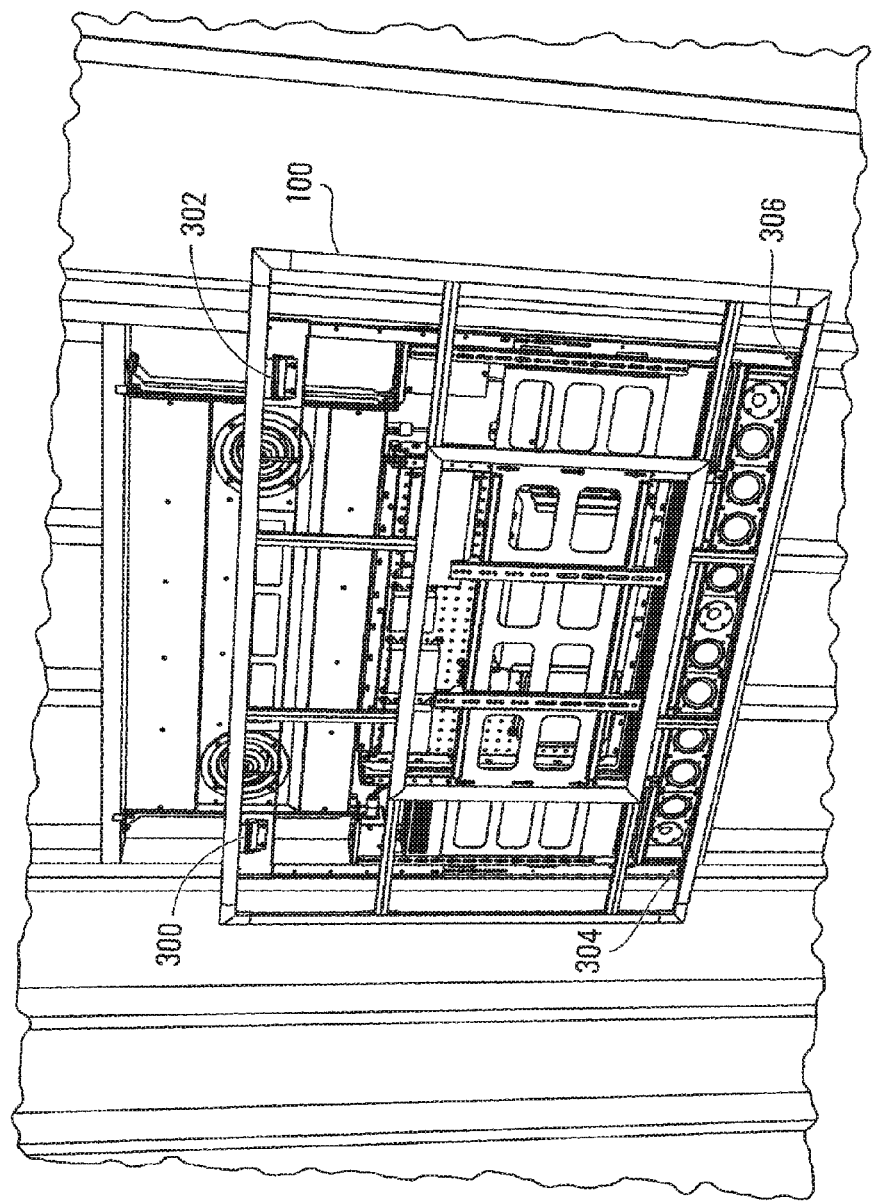
FIG. 23 as a perspective view of the embodiment of FIG. 22 with the cloth fabric of the wall opening cover removed for the purposes of illustration, thereby revealing an inner opening of the cover through which the display devices mounted outside the wall and through which a power cable and/or one or more signal cables are run from inside the wall to the display device outside the wall, the inner opening also facilitating cooling inside the wall.

The system 10 may include vertical hanger members 32, 34 designed to be affixed directly to the display device 40 (TV) by hanging and operably configured to cooperate with the display mounting member 30, to support the display in front of the support member 20 and the wall opening cover 100 (see FIG. 22). The hangers 32, 34 include dedicated slots operably configured to mate with the display mounting member 30 to provide a strong, secure mounting assembly to support the display device 40. The vertical hangers 32, 34 may include integral holes and/or slots to allow vertical adjustment when affixed to the display (TV).

Figure 31:
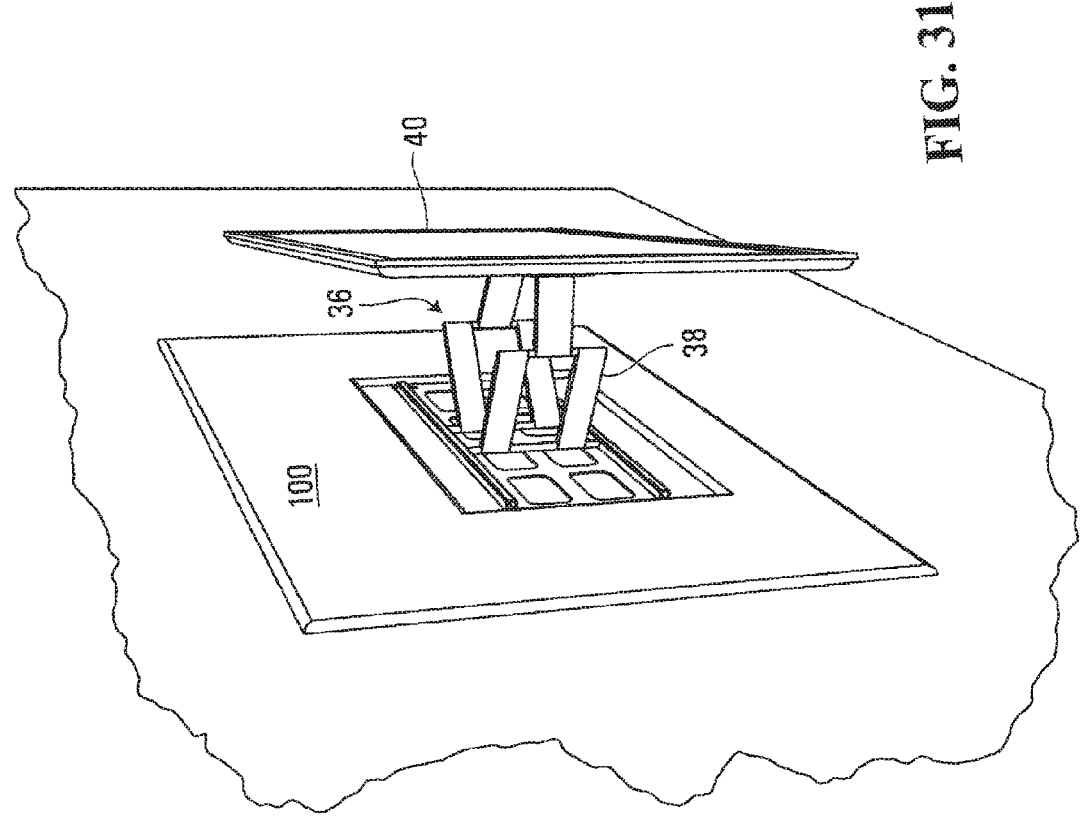
FIG. 31 is a perspective view of an alternate embodiment in which the display device is connected to the wall via an articulating mounting member.

FIG. 31 illustrates an embodiment of a display mounting member 30 operably configured to support an articulation mechanism 36 comprising a plurality of hinged arms 38 interconnecting the display device 40 with the wall 14. In this embodiment, the display device 40 may be moved slightly outwardly from the wall and may be tilted horizontally or vertically to provide better viewing from the side. The extent to which the display is pulled out from the wall has been greatly exaggerated in this figure simply in order to fully illustrate the hinged arms.

Wall Opening Cover

Figure 16:
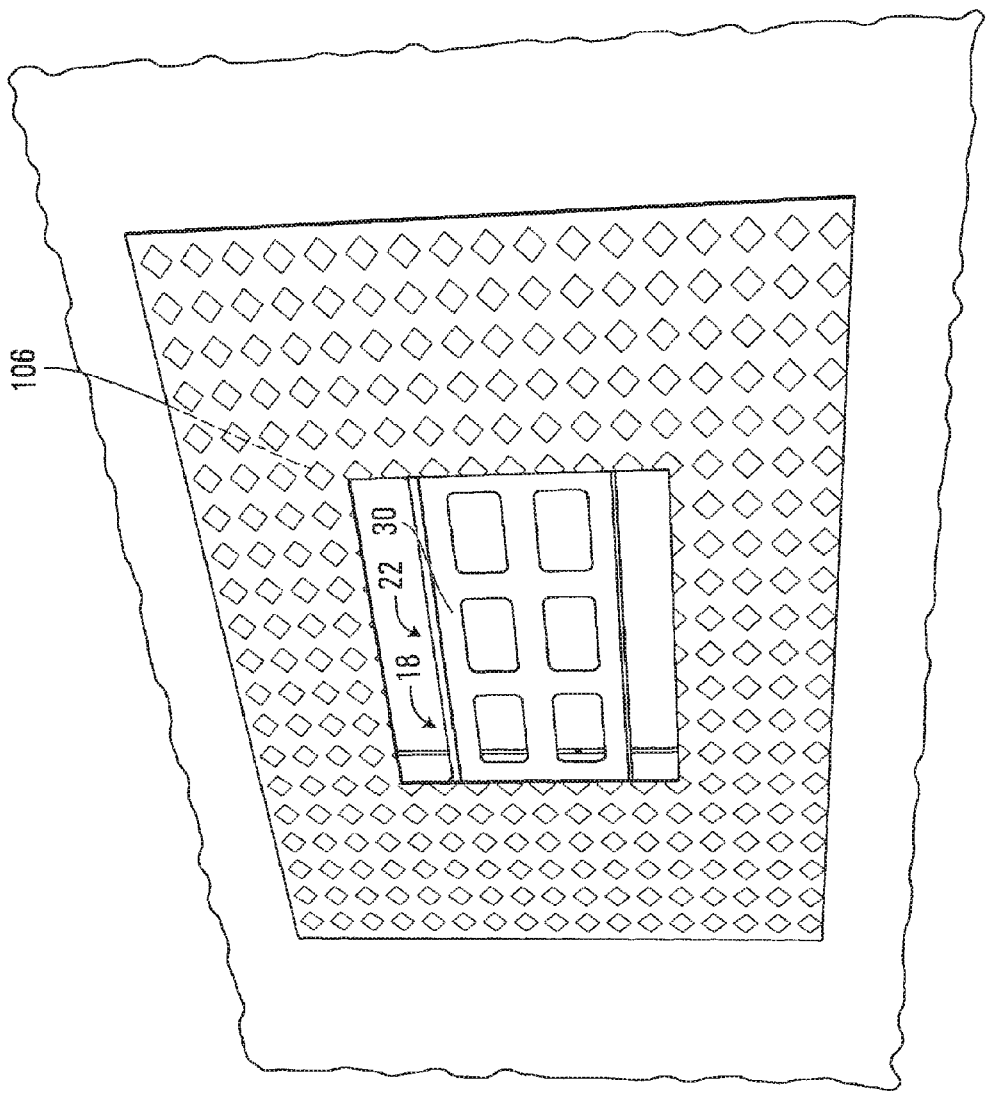
FIG. 16 is a perspective view of the support member of FIG. 15 and further including a wall opening cover mounted to obstruct the view of it be some components mounted within the support member area, the wall opening cover being dimentioned to conceal a least a peripheral portion of the in-wall space.

Referring to FIG. 16, the mounting apparatus 12 includes a wall opening cover 100. In the embodiment shown in FIG. 16, the cover 100 is installed directly in front of the support member 20. The cover 100 is operably configured to hide from view the internal components located within the support space 22 located within the wall, and provide an aesthetically appealing and customizable design element as part of the overall system. In some embodiments, a design professional may wish to select an acoustically transparent fabric for the cover 100 that best matches the interior décor of the room in which the system 10 will be located.

Alternatively, in some embodiments where a fabric cover 100 is not desired or appropriate, the cover 100 may be formed of the solid material to have a solid surface. In such embodiments, the cover 100 may include at least one slot aperture or a plurality of unobtrusive openings in the cover 100 to allow sound to emanate from loudspeakers placed within the wall, for example, to exit from LCR and subwoofer loudspeakers in the in-wall space.

Figure 34:
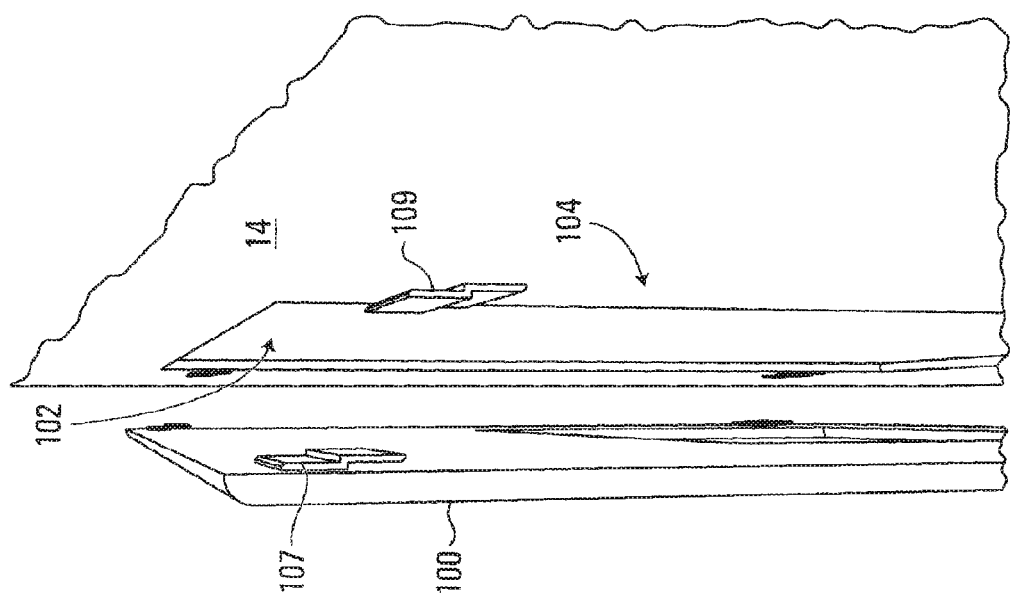
FIG. 34 is an alternative embodiment of a mounting mechanism for the wall opening cover wherein the wall opening cover uses mutually engaging connectors on the cover and the finished wall surface to suspend the cover behind the display device and in front of the wall opening leading to the in-wall space.

The cover 100 may be removably affixed to the wall surface interface member 106 or to the support member 20 by any one of a variety of methods, or by a combination of methods. In one embodiment, the cover 100 is affixed using powerful magnets. This contributes to a very clean and appealing appearance of the finished installation. In some embodiments, the wall opening cover 100 may be supported by the support member 20 installed in the wall. In other embodiments, the wall opening cover 100 may be supported in its installed position by the wall surface itself. For example, as shown in FIG. 34, the cover 100 may include a connector on its rear surface, and a portion of the wall surface intended to remain underneath the cover 100 during use may include a complementary connector. In FIG. 34, the connector includes a compact Z-clip 107, 109. Other ways of attaching the cover 100 to the wall surface include a removable light adhesive placed between the cover 100 and the wall surface 104, or a hook and loop fastener set such as Velcro™. Alternatively, the cover 100 may be attached by a combination of methods. In the embodiment shown in FIG.

23, the top portion of the cover 100 is affixed to the wall surface interface member by hanging using a French cleat 300, 302, whereas the bottom portion of the cover 100 is affixed by magnets configured to match to threaded, adjustable-depth metal spacers of the support member 20, as shown at 304, 306. The French cleat includes first and second matching connecting pieces mounted on the cover and the wall interface member, respectively, wherein the first and second connecting pieces have complementary beveled edges configured to mate with each other to facilitate hanging the cover on the wall interface member. It will be appreciated that the position of the cover on the wall will depend on the position of the wall interface member, which in turn, will depends on the size of the display device 40 that is intended to be used. In other words, the wall interface member is movable to provide a suitably sized finished wall opening for a given size of display device 40. Because of the manner in which the wall opening cover is mounted to the wall surface interface member, the bottom edge of the finished wall surface will generally align with an upper edge of the cover 100. The wall opening cover 100 will thus be inherently repositioned to cover the final wall opening for any size installation.

Figure 27:
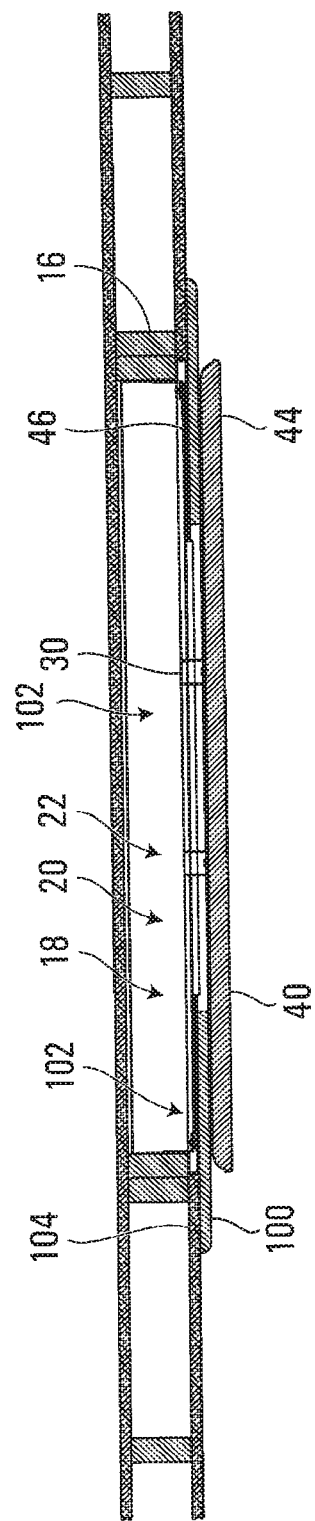
FIG. 27 is a top sectional view of the wall, including the support member embedded within the wall, and the wall opening cover and display device situated outside the wall surface and configured to obstruct the view of any electronic components located within the wall.

Once installed, there remains no visible means of attachment for the cover 100. FIG. 27 shows a top cross-sectional view of the display device 40 and the wall opening cover 100, as they serve to obstruct the view of the inner-wall space within which the remainder of the components of the system 10 are mounted. In one embodiment, the cover 100 becomes gradually thicker in cross-sectional area as it moves from a peripheral edge of the cover to an inner portion of the cover, having a maximum thickness of about ⅝ of an inch. In this embodiment, there is a further approximately ⅛" clearance between the thickest portion of the cover and a rear surface of the display device 40. In this embodiment, the inner opening of the cover is about 29-31 inches wide by about 18-20 inches high, however, other dimensions for the inner opening may also work. The outer periphery of the cover 100 can be of different sizes depending on the size of the display device 40 that will be used in the installation. In some embodiments, the cover 100 may extend about 5 inches beyond the outer periphery of the display device 40, or in other embodiments, between about 2 inches to 8 inches beyond the outer periphery of the display device 40.

Figure 25:
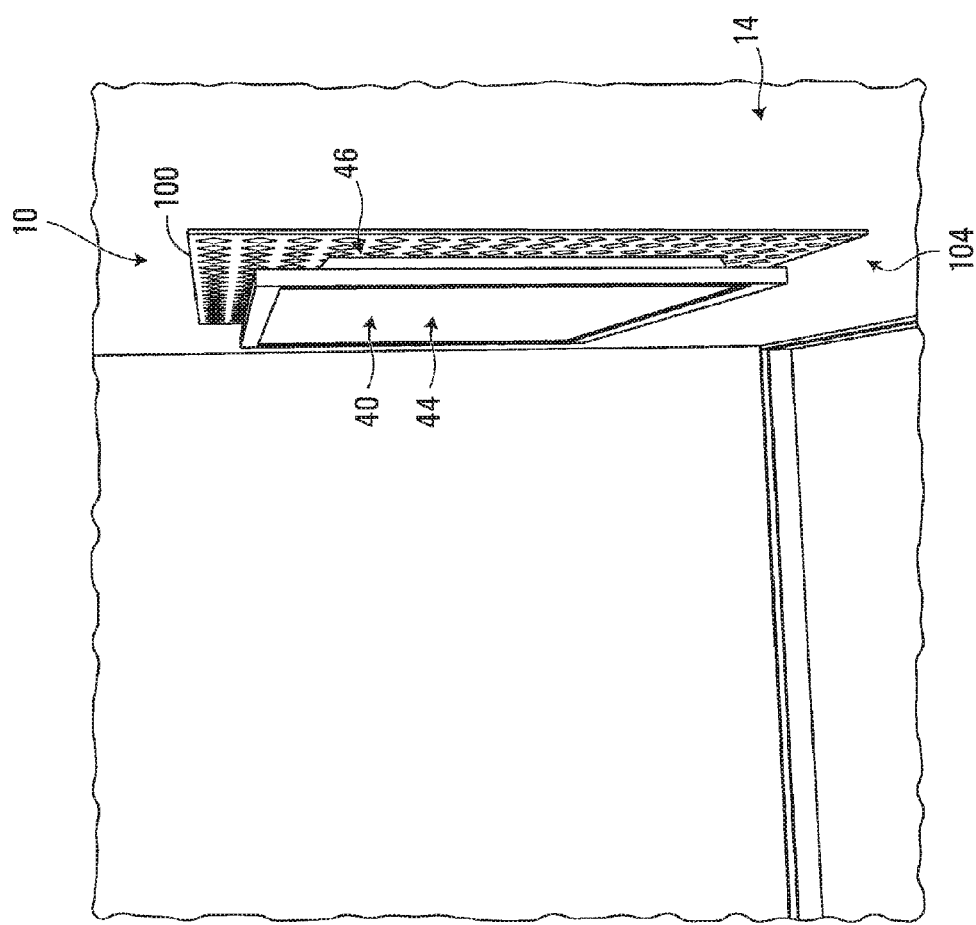
FIG. 25 is a side perspective view of the display device and cover of FIG. 24 from an extreme angle that is unsuitable as a viewing position for the display device, and yet the cover still serves to obstruct the view of electrical components in the wall due to the overlap of an inner portion of the cover with the projection of the outline of the display device onto the plane of the cover.

In most embodiments, the inner opening in the cover 100 will be dimensioned to be substantially smaller than the display device 40. This means that at least a portion of the cover overlaps with a peripheral portion of the display device 40 if viewed from a front position directly in front of the display device 40. In other words, a projection of the display device 40 onto the plane of the cover will overlap somewhat with an inner, overlapping portion of the cover. The overlapping portion obstructs a viewer's view of the in-wall support space 22 behind the overlapping portion, even if the display device 40 is not mounted. This is not particularly useful from a direct frontal viewing position since, once the display device 40 is mounted, the aforesaid portions of the in-wall support space 22 are not visible to the viewer, because the display device 40 obstructs a clear line of sight to them (whether or not a cover is mounted behind the display device 40). However, because the cover and the display device 40 are located in different, albeit generally parallel planes, the overlapping portion of the cover is useful in obstructing a viewer's view of the in-wall space 18 at an extreme angle of view. For example, FIG. 25 illustrates a perspective side view of a completed AV system 10 installation from one extreme angle that is unsuitable for use as a viewing position for the display. Notwithstanding the extreme angle of this viewpoint, the in-wall space 18 is not visible to the viewer. This is because, even though the cover is mounted in a plane which is spaced apart from the plane in which the display is mounted, the overlapping portion of the cover, as defined above, serves to obstruct the viewer's view into the in-wall space, even where no portion of the display device 40 is able to obstruct the view at this angle. Furthermore, it will be appreciated that the front of a display device 40 may be a different size than the rear of the display device 40. Indeed, the rear of the display device 40 may be smaller in overall area than the front of the display device 40. Accordingly, the dimensions of the cover's overlapping portion are chosen based on the size of the rear portion of the display device 40 and the distance by which it is spaced apart from the wall. If the rear portion of the display device 40 is relatively smaller and/or it is spaced relatively further from the wall, a larger overlapping portion is used to ensure that the cover is effective in concealing the in-wall space. If the rear portion of the display device 40 is relatively smaller and/or it is spaced relatively closer to the wall, the overlapping portion may be smaller. Configuring the cover in this manner preserves the benefits of mounting the display device 40 spaced apart slightly from the wall (e.g., the display device 40 is better able to dissipate heat, avoiding the kinds of thermal problems that could arise if it was embedded into the wall), but not at the cost of allowing a viewer to see into the in-wall space, which would be unsightly.

In many typical embodiments, the cover 100 will be symmetrical with respect to the horizontal and vertical axes of the display device 40, for example, the cover may extend past the periphery of the display device 40 on all sides of the display device 40 to effectively "frame" the entire display device 40 in a symmetrical manner, as viewed from a frontal viewing position. In some embodiments, the cover will be symmetrical only with respect to one of the horizontal and vertical axes of the display device 40. For example, if the cover is non-rectangular (e.g., the cover is a symmetrical trapezoid), it may be viewed as symmetrical with respect to the horizontal axis of the display device 40 but not with respect to its vertical axis. In still other embodiments, the cover will be asymmetrical with respect to the display device 40, as viewed from a frontal viewing position.

In part, the shape of the final wall opening, and thus the shape of the cover, may differ depending on the composition of the speakers in a particular system installation. For example, in one embodiment, the installation may have left and right speakers 82, 84 as shown in FIG. 32 but no subwoofer 180 or center speaker. In such an embodiment, the in-wall space 18 of the system 10 may be configured to only extend past the display device 40 on the left and right sides, but not below or above the display device 40. In this case, the cover may be suitably dimensioned to only extend to the left and right of the display device 40, but not necessarily above and below it (as viewed from a front view). If the preceding embodiment is modified by adding a subwoofer positioned as shown in FIG. 32 (but still omitting the center speaker), it may be appropriate to provide a cover which takes the shape of an inverted "U". In another embodiment which has only the LCR speakers as shown, for example, in FIG. 19, but no subwoofer, the cover may be be installed asymmetrically, being configured to only extend below the display device 40 but not extend to the left, right, or above the display device 40. Other cover shapes may be used for aesthetic purposes, even where they are unnecessary to permit sound waves from an underlying in-wall speaker to pass through.

Figure 30B:
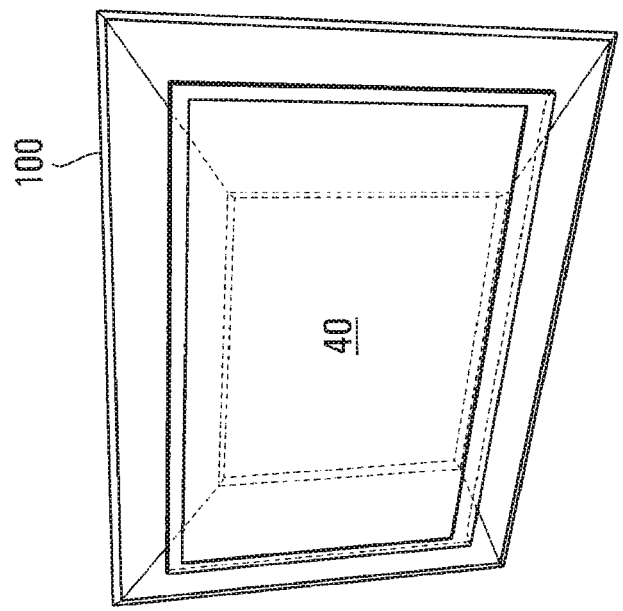
FIG. 30B is an alternate embodiment of the cover wherein the cover is formed of a plurality of pieces, joined at the respective corners of the cover.
Figure 30A:
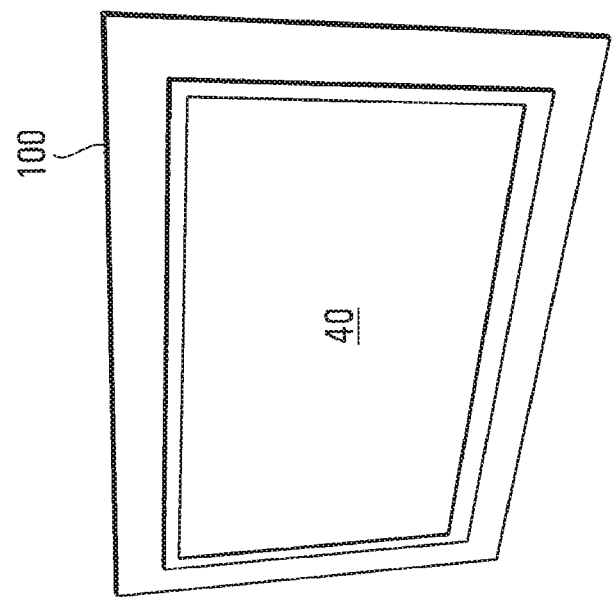
FIG. 30A is an alternate embodiment of the cover operably configured to be recessed into a wall opening surrounding and behind the display device so as to be generally flush with the final wall surface.

FIG. 30A illustrates an alternative embodiment of the cover in which the cover is slightly recessed into the wall such that it is flush with the finished wall surface. FIG. 30B illustrates an alternative embodiment in which the cover is not a unitary piece, but rather, is formed from four pieces which attach together along the diagonal lines emanating from each corner to the corresponding corners of the inner opening of this embodiment of the cover.

Methods of Installation

In view of the above description of various embodiments of the invention, the following summary provides an exemplary embodiment of an installation method of the AV system 10 and mounting apparatus 12 of the invention. In some cases, the mounting apparatus 12 (including the support member 20 and accessories thereto), may be provided in the form of a kit to the installer.

1. For retrofit installations (as opposed to new construction installations), remove the wall surface material (typically drywall) from the portion of the wall where the system 10 will be installed.

2. Create a framed window-style opening within the wall framing members that measures about 48" high by 48" wide. (A different size opening can be used for a different embodiment, depending on the mounting apparatus 12 that is being used and the size of the display device 40 that will be installed.) In some cases, install at least one additional wall support reinforcement member 26, such as one or more 2"×4" wood pieces attached in parallel to the original wooden wall studs 16, prior to installation of the mounting apparatus 12 in the wall. Ensure that all sides are square and plumb.

3. Place a support member 20 of the mounting apparatus 12 into the framed opening and position it such that it is resting on a lower horizontal cross member of the framed opening, and that the back surface of a front flange of the support member 20 is resting against the front face of the wall framing members.

4. Securely affix the support member 20 to the wall framing using the appropriate fasteners (e.g., wood or metal screws) through the sides of the support member 20 in the holes provided.

5. Optionally, install at least one temporary reinforcement member across the support member 20 to stiffen the support member 20 while it is being installed. Next, position the subwoofer mount (e.g., a subwoofer bracket), while leaving the temporary reinforcement member installed, in the space above the support member 20.

6. Using the supplied fasteners (e.g., machine screws), affix the subwoofer mount to the support member 20.

7. Next, affix the top flanges of the subwoofer mount to the horizontal framing member at the top of the 48" by 48" framed opening and ensure that any temporary alignment clips used are flush with the face of the framing. This will ensure that the subwoofer mount is positioned in the exact centre of the framed opening which is important to the correct positioning of the subwoofer during final installation.

8. Next, remove the temporary reinforcement members and the alignment clips.

9. If the wall surface interface member is not part of the support member 20, install the wall surface interface member to the support member 20. Adjust and set the wall surface interface member at the desired height as specified for the size of display device 40 (e.g., television) being used.

10. Install the line voltage connection member 120 and make the electrical connection that feeds electrical power to the line voltage connection member. Install the protective cover on the line voltage connection member.

11. Install the low voltage connection member 130 and make all low voltage cabling connections. Install the protective cover on the low voltage connection member.

12. Install a protective cover system, including an upper protective cover and a lower protective cover, onto the face of the support member 20, to protect the inside of the support area from construction debris. Secure both covers using the supplied fasteners.

13. Apply the final wall surface (typically drywall) to the wall framing. Ensure that the wall surface extends up to and directly abuts all four sides of the support member 20 (or to the wall surface interface member), but does not directly cover the support member 20. Apply any final finish materials to the wall surface (e.g., paint or wall paper).

14. Once the final wall finishing is complete, remove the protective cover system.

15. Install the subwoofer enclosure into the upper portion of the support member 20. Use the locating/centering pins 198, 199 that extend slightly from the subwoofer mount to align with the corresponding guide slots 186 in the side panels of the subwoofer enclosure as you press the enclosure upward into position above the support member 20. Securely affix the subwoofer enclosure using the four fasteners (e.g., machine screws) provided. Using the supplied cable, connect the input of the subwoofer to the corresponding subwoofer output connector located within the top portion of the signal processor 70, once the signal processor 70 has been installed.

16. Install the power distribution module 50 on the left side of the support member 20 using the two positioning guide slots provided 251, 252. Once in position, lower the power distribution module 50 such that it is seated firmly in the support member 20 and the connections at the bottom of the power distribution module 50 are mated to the corresponding connections on the power and signal distribution circuit or backplane. Install suitable fasteners (e.g., two machine screws) to affix the power distribution module 50 in place to the support member 20. Connect the male locking power connector on the power distribution module 50 to the corresponding female power receptacle on the line voltage connection member and twist to lock the connectors.

17. Install the multi-channel power amplifier 60 in the lower centre portion of the support member 20. The multi-channel power amplifier 60 will rest on the horizontal shelf that runs the full width of the support member 20. Once in position, slide the multi-channel power amplifier 60 back such that it is seated firmly in the support member 20 and each of the connections on the back side of the multi-channel power amplifier 60 are mated to the corresponding connections on the distribution circuit.

18. Install the AV signal processor 70 on the right side of the support member 20 using the two positioning slots provided 271, 272 (corresponding to the hangers 281, 282 in FIG. 33). Once in position, lower the signal processor 70 such that it is seated firmly in the support member 20 and the connections at the bottom of the signal processor 70 are mated to the corresponding connections on the distribution circuit. Install the appropriate fasteners (e.g., two machine screws) to affix the signal processor 70 in place.

19. Install the left, center and right loudspeakers (center channel speaker may be optional) in the lower horizontal cavity of the support member 20. The lower horizontal cavity may be configured as a loudspeaker receptacle operably configured to removably receive one or more loudspeaker enclosures. Slide each loudspeaker enclosure back such that it is seated firmly within the support member 20 and the connections on the back side of the loudspeakers are mated to the corresponding connections on the distribution circuit. In some embodiments, a plurality of loudspeakers, e.g., all of the LCR loudspeakers 80, may be combined in a single integrated enclosure, rather than having their own separate enclosures. In such embodiments, the single integrated enclosure is installed and removably received into the corresponding loudspeaker receptacle on the support member 20.

20. If this installation includes surround speakers, connect the speaker wire from each of the installed surround speakers to the corresponding surround speaker terminals located within the top portion of the signal processor 70.

21. Install the equipment mounting panel into the support member 20 using the supplied fasteners.

22. Install and affix the supplied mounting brackets for any required internal AV signal source, computing, communication and/or control equipment onto the face of the equipment mounting panel such that it is securely held in the support space 22.

23. Make all electrical and low voltage connections between the power distribution module 50, the signal processor 70, the AV signal, communication, and control equipment and secure all wiring to the equipment mounting panel.

24. Install the display mounting member 30 using the supplied machine screws.

25. Install the wall opening cover using the supplied hardware and adjust its position relative to the wall surface, so that the wall opening cover is flat and flush against the wall surface. For example, in one embodiment, you might affix the cover by hanging the cover using a French cleat at the top of the cover and affix the bottom of the cover by attaching magnets on the bottom of the cover to adjustable-depth magnetic stops/spacers on the support member 20.

26. Install the two display mounting member 30 hangers onto the back of the flat panel display device 40.

27. Make the power connection between the flat panel display device 40 and the power distribution module 50.

28. Make all low voltage cabling connections between the flat panel display device 40 and the signal processor 70.

29. Install the flat panel display device 40 onto the display mounting member 30, such that the display device 40 is suspended on the wall in front of the wall opening cover, and spaced apart from the finished wall surface.

It will be appreciated that some of the above steps may be omitted, substituted, performed in parallel, or performed in a different order, as appropriate, depending on the specific requirements of the AV system 10 installation at issue and the features of the specific embodiment of the apparatus 12 being used to install the system 10.

Completed Installation

Figure 24:
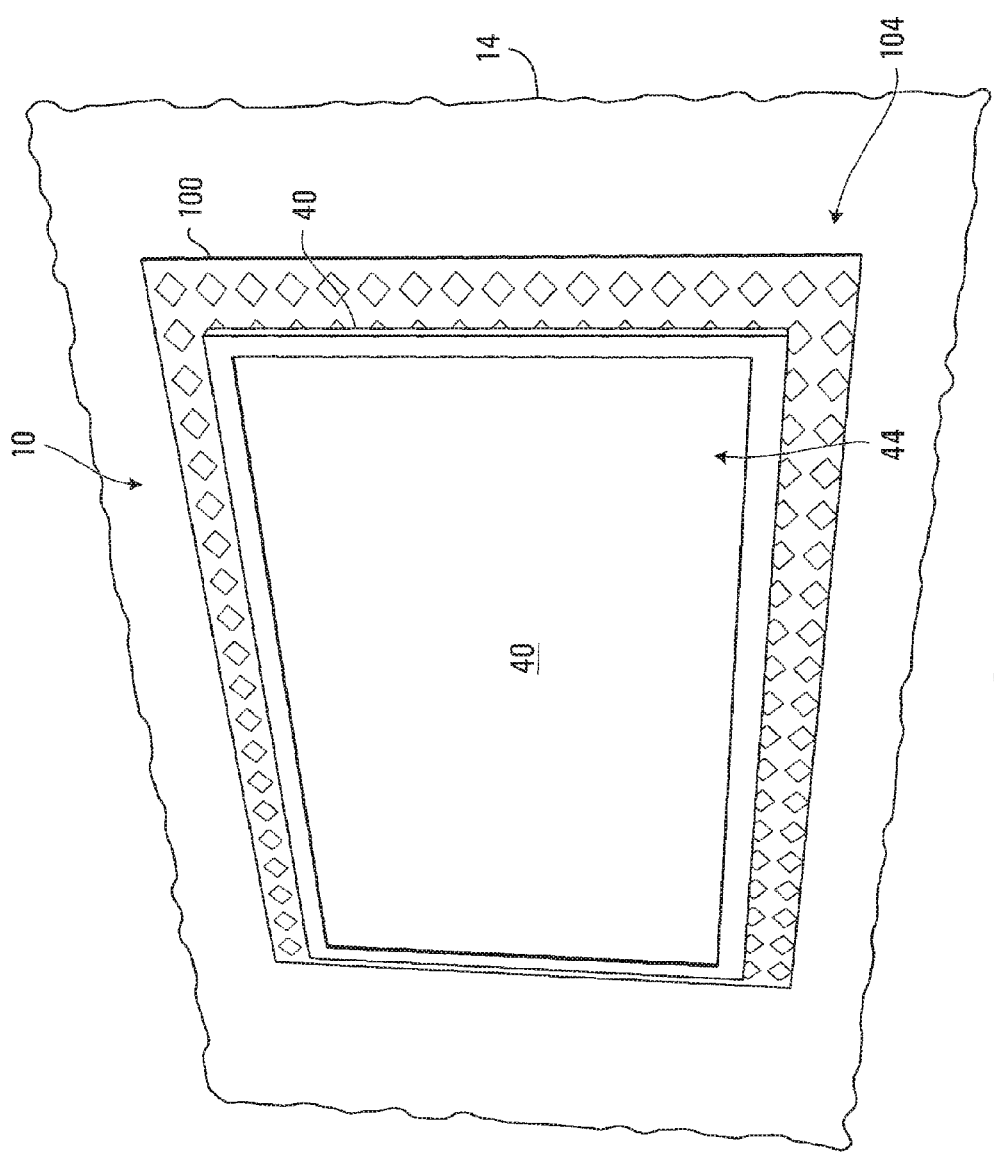
FIG. 24 is a slightly angled front perspective view of the embodiment of FIG. 23 after installation of the AV system has been completed, including mounting of the wall opening cover and the display device on the wall, the cover concealing the least a peripheral portion of the in-wall space from the viewer.

FIGS. 24 and 25 provide perspective front and side views of an AV system 10 installation in a wall upon completion, according to one embodiment. In this embodiment, system 10 installation is complete when the display device 40 or TV has been mounted to the display mounting member 30 such that the display device 40 or TV is suspended in front and spaced apart from the wall opening cover. Although the finished installation in this embodiment includes a high-definition display device 40, a mounting system, high performance loudspeakers, multichannel power amplification, AV signal processing/switching and distribution, a plurality of high definition AV signal sources, audio processing and decoding for Dolby and DTS surround formats, and power distribution and surge protection for all components, all that is visible in the completed installation is the display device 40 and the wall opening cover employed to visually "frame" the display device 40 for an aesthetically pleasing and ultra-low profile finished installation.

While specific embodiments of the invention have been described and illustrated, such embodiments should be considered illustrative of the invention only and not as limiting the invention as construed in accordance with the accompanying claims. It should also be appreciated that the embodiments disclosed herein are not mutually exclusive such that features of one embodiment may be combined with those of another embodiment to form further embodiments falling within the scope of these claims. Similarly, it should be appreciated that various other possible combinations and permutations of the internal and external components described herein may form still further embodiments falling within the scope of these claims. Furthermore, in other embodiments of the invention, some components described above as removably mountable may instead be integral or permanently mounted, whereas some components described as integral or as permanently mounted, may instead be made to be removably mountable.

What is claimed is:

1. A mounting apparatus for an audio-video system, comprising:
    a support member providing a support space for holding at least one component of the audio-video system, the support member being operably configured to be installed in an in-wall space located within a wall such that the support space is disposed within the in-wall space and is accessible through a wall opening of the wall, the support member defining an access region operable to register with the wall opening to provide access to the support space through the wall opening from outside the wall, wherein the support member comprises a plurality of locations adapted to facilitate removably mounting a corresponding plurality of electronic devices comprising at least one of an audio-visual signal source, a switching, a distribution and an amplification device;
    a display mounting member connected to the support member and operably configured to mount a display device such that the display device, when mounted, is positioned outside the wall to conceal a first portion of the in-wall space from a viewer situated to view the display device from a generally frontal display viewing position outside the wall; and
    a cover operably configured to be removably mounted in a plane disposed generally in parallel to a plane of the wall and interposed between the support space and the display device, the cover being dimensioned to conceal a second portion of the in-wall space separate from the first portion of the in-wall space, a peripheral portion of the cover being dimensioned to overlap a wall surface portion proximate the wall opening to conceal the wall surface portion.

2. The apparatus of claim 1 wherein the cover is dimensioned to overlap with a peripheral portion of the display device when the display device is mounted in position, as viewed from the viewing position.

3. The apparatus of claim 1 wherein the outer periphery of the cover is dimensioned to be (a) wider than the display device, (b) taller than the display device, or (c) both wider and taller than the display device.

4. The apparatus of claim 1 wherein the cover is operably configured to be removably mounted to the support member.

5. The apparatus of claim 1 wherein the cover is operably configured to be removably mounted to an outer wall surface proximate the wall opening.

6. The apparatus of claim 1 wherein the cover is operably configured to be removably mounted while spaced apart from the display device.

7. The apparatus of claim 1 wherein the cover is operably configured to be removably mounted from being flush with an outer wall surface.

8. The apparatus of claim 1 wherein the cover is sufficiently rigid to maintain its form when removed from the wall.

9. The apparatus of claim 1 wherein the cover is operably configured to be removed from the wall without using any tools.

10. The apparatus of claim 1 wherein the cover is mounted to the support member using a French cleat.

11. The apparatus of claim 1 wherein the cover is mounted to the support member using at least one magnet.

12. The apparatus of claim 1 wherein the cover is mounted to the support member using any member of the group consisting of an adhesive, a wall plug, and a hook and loop fastener material.

13. The apparatus of claim 1 wherein a rear portion of the cover is disposed generally flat against the concealed wall surface portion proximate the wall opening.

14. The apparatus of claim 1 wherein the cover is dimensioned to conceal at least one peripheral portion of the wall opening.

15. The apparatus of claim 1 wherein the cover is configured to be substantially symmetrical with respect to at least one of a vertical or a horizontal axis of the display device.

16. The apparatus of claim 1 wherein the cover is at least as large as the display device.

17. The apparatus of claim 1 wherein a peripheral portion of the cover forms a visible frame generally around the entire display device when viewed from the viewing position.

18. The apparatus of claim 17 wherein the visible frame is substantially symmetrical with respect to the display device when viewed from the viewing position.

19. The apparatus of claim 1 wherein the cover in its mounted position is spaced apart from the display device in a horizontal direction generally perpendicular to the wall and is disposed proximate a plane of an outer surface of the wall.

20. The apparatus of claim 1 wherein the mounted cover is operably configured to be spaced apart from the display device by substantially the same distance over an area spanning the rear surface of the display device.

21. The apparatus of claim 1 wherein the cover when mounted is oriented such that each vertical edge of the cover is substantially parallel to a corresponding vertical edge of the display device as viewed from the side.

22. The apparatus of claim 1 wherein the support member and the at least one component are dimensioned to fit inside a wall having about a 4 inch depth.

23. The apparatus of claim 1 wherein the support member is operably configured to be mounted within an in-wall space of about 48 inches high by about 48 inches wide in size.

24. The apparatus of claim 1 wherein the support member is operably configured to be mounted within an in-wall space larger than 48 inches high by about 48 inches wide in size.

25. The apparatus of claim 1 wherein the support member upon installation is partly covered by a replacement wall surface coplanar with the original wall.

26. The apparatus of claim 1 wherein the display mounting member is operably configured to mount and position the display device in a display device position spaced apart from a plane defined by an outer surface of the wall.

27. The apparatus of claim 1 wherein the support member is operably configured to house the plurality of audio-visual signal source, switching, distribution and/or amplification devices.

28. The apparatus of claim 27 wherein the support member comprises a generally box-shaped frame.

29. The apparatus of claim 1 further comprising:
a signal processor operably configured to receive a plurality of input signals from a plurality of signal sources and to generate a first output signal to the display device based on the plurality of input signals, the signal processor being mounted in the support space.

30. The apparatus of claim 29 further comprising a first signal source device of the audio-video system removably mounted in the support space and operably coupled to provide a first input signal to the signal processor.

31. The apparatus of claim 30 further comprising:
a second signal source device of the audio-video system removably mounted in the support space and operably coupled to provide a second input signal to the signal processor; and
a power distribution module connected to the support member and disposed in the in-wall space, the power distribution module operable to provide electrical power to the display device and to the first and second signal source devices.

32. The apparatus of claim 1 further comprising at least one signal source from a signal source device located outside the wall.

33. A cover operably configured to be removably mounted between a display device mounted outside a wall and an in-wall space located within the wall and accessible from outside the wall through a wall opening in the wall, the wall opening being dimensioned larger than the display device in at least one dimension of height and width, wherein the cover is dimensioned to conceal a peripheral portion of the wall opening that is not otherwise concealed from a viewer by the display device at a display viewing position, a peripheral portion of the cover dimensioned to overlap a wall surface portion of the wall proximate the wall opening to conceal the wall surface portion, wherein the cover is operably configured to cooperate with a support member providing a support space for holding at least one component of an audio-video system, the support member being operably configured to be installed in the in-wall space located within a wall.

34. The cover of claim 33 wherein the cover is dimensioned to visually frame the display device to the viewer in a generally symmetric manner.

35. The cover of claim 33 wherein the cover comprises acoustically transparent fabric operable to permit acoustic waves generated in the in-wall space to pass through the cover.

36. The cover of claim 33 wherein the cover has an inner opening, the inner opening operable to permit at least one electrical conductor to pass through to carry an electrical power signal from the in-wall space to power the display device.

37. The cover of claim 33 wherein the cover has an inner opening configured to permit a portion of a display mounting member located partially in the in-wall space, to pass through the inner opening, to facilitate mounting the display device outside the wall.

38. The cover of claim 37 wherein the cover comprises an outer frame and an inner frame, the inner frame defining the inner opening.

39. The cover of claim 33 wherein the cover is adapted to conceal a plurality of speakers located in the in-wall space, wherein the plurality of speakers would be in a line of sight of the viewer if the cover was absent.

40. An audio-video system comprising:
a support member providing a support space for holding components of the audio-video system including a plurality of signal source devices removably mounted in the support space, the support member being installed in an in-wall space located within a wall such that the support space is disposed within the in-wall space and is accessible through a wall opening of the wall, the support member defining an access region operable to register with the wall opening to provide access to the support space through the wall opening from outside the wall;
a display mounting member connected to the support member and operably configured to mount a display device such that the display device is positioned outside the wall;
a signal processor operably configured to receive a plurality of input signals from a plurality of signal sources and to generate a first output signal to the display device based on the plurality of input signals, the signal processor being mounted in the support space;
a display device mounted on the display mounting member and spaced apart from the support space, the display device being configured to receive the first output signal from the signal processor; and
a first signal source device of the audio-video system removably mounted in the support space and operably coupled to provide a first input signal to the signal processor.

41. The system of claim 40 further comprising
a second signal source device of the audio-video system removably mounted in the support space and operably coupled to provide a second input signal to the signal processor; and
a power distribution module connected to the support member and disposed in the in-wall space, the power distribution module operable to provide electrical power to the display device and the first and second signal source devices.

42. The system of claim 41 further comprising at least one signal source from a signal source device located outside the wall.

43. The system of claim 42 further comprising:
a cover operably configured to be removably mounted between the display device mounted outside the wall and the in-wall space;
wherein the wall opening is dimensioned larger than the display device in at least one dimension of height and width;
wherein the cover is dimensioned to conceal a peripheral portion of the wall opening that is not otherwise concealed from a viewer by the display device at a display viewing position, and a peripheral portion of the cover is dimensioned to overlap a wall surface portion of the wall proximate the wall opening to conceal the wall surface portion; and
wherein the cover is operably configured to cooperate with the support member providing the support space for holding the components of the audio-video system.

44. The system of claim 40 wherein the support member comprises a connector for a power distribution module.

45. The system of claim 40 wherein the support member comprises at least one connector for removably mounting at least one loudspeaker to the support member.

46. The system of claim 40 wherein the support member comprises a connector for removably mounting an amplifier to the support member.

47. The system of claim 40 wherein the support member comprises a connector for removably mounting an audio-video processor to the support member.

48. The system of claim 40 wherein the support member comprises a mount for a subwoofer comprising a subwoofer mounting bracket.

49. The system of claim 40 wherein the support member comprises at least one connector for LCR speakers to be disposed in the in-wall space.

50. The system of claim 40, the apparatus further comprising a subwoofer mount operably configured to permit mounting of a subwoofer at any one of a plurality of vertical positions such that a center of a driver of the subwoofer is disposed between an edge of the display device and an edge of the cover, as viewed in a side elevation view.

51. The system of claim 50 wherein the subwoofer mount is operably configured to slidingly receive the subwoofer for mounting.

52. The system of claim 40 wherein the apparatus further comprises a low voltage connection member for terminating a plurality of low voltage cables entering the in-wall space.

53. The system of claim 52 wherein the low voltage connection member is operably configured to receive low voltage signals including an audio-video signal and a data signal for use by corresponding audio-video system components.

54. The system of claim 40 wherein the apparatus further comprises a power distribution module operably connected to a line voltage, the power distribution module converting the line voltage to at least one low voltage for use by at least one of the components of the audio-video system.

55. The system of claim 54 wherein the power distribution module is connected to a connector that is connected to a power amplifier for producing audio signals, wherein the power amplifier is mounted to the support member.

56. The system of claim 55 wherein the apparatus further comprises a signal processor mounted to the support member and located in the in-wall space, the signal processor being powered by the power distribution module.

57. The system of claim 56 wherein the signal processor includes a plurality of HDMI inputs and at least one HDMI output.

58. The system of claim 57 wherein the apparatus further comprises an audio power amplifier mounted to the support member in the in-wall space, the audio power amplifier being powered by the power distribution module.

59. The system of claim 58 wherein the audio power amplifier is located proximate an elongate speaker region comprising a left speaker, a center speaker and a right speaker generally horizontally disposed in series along a longitudinal axis of the elongate speaker region.

60. The system of claim 59 wherein the audio power amplifier is provided in an elongate form factor having a longitudinal axis generally parallel to the longitudinal axis of the elongate speaker region.

61. The system of claim 60 wherein the elongate form factor of the audio power amplifier at least partially spans each of the left, center and right speakers.

62. The system of claim 61 wherein the left, center, and right speakers each comprise a respective sound emitting slot.

63. The system of claim 62 wherein each sound emitting slot is oriented to be generally parallel to the longitudinal axis of the audio power amplifier.

64. The system of claim 40 further comprising a plurality of speaker enclosures wherein at least two of the plurality of speaker enclosures are operably configured to abut each other when mounted to the support member.

65. The system of claim 64 wherein left and right speakers of the apparatus are operably configured to abut the center speaker at opposite ends thereof when mounted.

66. The system of claim 65 wherein the left, center, and right speakers are encased in a single, continuous enclosure.

67. The system of claim 66 wherein each of the left, center and right speakers includes a respective connector designed to mate with a corresponding connector mounted to the support member and operably configured to provide a speaker level audio signal.

68. The system of claim 64 wherein the plurality of speakers enclosures are arranged to emit sound along an edge of the display device and directed towards the viewer's position.

69. The system of claim 64 wherein a left speaker enclosure is located to the left of the display device, the right speaker is located to the right of the display device, and the center speaker enclosure is generally below the display device.

70. The system of claim 40 further comprising an AV signal source mount operable to providing mounting for a plurality of AV signal source devices in the support space.

71. The system of claim 70 wherein the plurality of AV signal source devices comprises at least two of the group comprising a set-top box, a satellite receiver, a TV device, a streaming media player, a small form factor computer, and a balun based system used to extend an AV signal from an externally located AV signal source device.

72. The system of claim 71 wherein the AV source mount is operably configured to mount a bracket intended for use with a specific AV signal source device.

73. The system of claim 40 wherein the apparatus further comprises a wall surface interface connected to the support member, the wall surface interface operably configured to provide an interface between the apparatus and a final wall surface when the apparatus is installed in the wall.

74. The system of claim 73 wherein the wall surface interface forms a border for abutting the final wall surface.

75. The system of claim 74 wherein the wall surface interface is operably configured to mount a display device mounting member.

76. The system of claim 75 wherein the wall surface interface is operably configured to mount a cover.

77. The system claim 76 wherein the wall surface interface comprises a panel that is affixed to a front surface of the support member proximate a position of the wall surface.

78. The system of claim 40 wherein the display device mounting member comprises a metal bracket adapted to support the display device in front of the support member and in front of a wall opening cover.

79. The system of claim 78 wherein the display device mounting member is operably configured to be adjusted both vertically and horizontally to allow precise placement of the display device in front of the cover when the cover is mounted.

80. The system of claim 79 wherein the display device mounting member comprises openings adapted to provide cable management between the display device and the in-wall space.

81. The system of claim 79 wherein the display device mounting member comprises openings communicating with the wall opening and operable to facilitate cooling of components within the in-wall space by permitting circulation of air between the in-wall space and outside the wall.

82. The system of claim 40 wherein access to the in-wall space is provided when the cover is removed.

83. An entertainment system having a positionable in-wall loudspeaker mounting, the system comprising:
a support member providing a support space for holding at least one component of the audio-video system, the support member being operably configured to be installed in an in-wall space located within a wall such that the support space is disposed within the in-wall space and is accessible through a wall opening of the wall, the support member defining an access region operable to register with the wall opening to provide access to the support space through the wall opening from outside the wall;
a display device mounting member connected to the support member and operably configured to mount a display device such that the display device, when mounted, is positioned outside the wall to conceal a first portion of the in-wall space from a viewer situated to view the display device from a display viewing position outside the wall;
a loudspeaker enclosure; and
a loudspeaker mounting member including a guide for receiving the loudspeaker enclosure into a mounted position in which the loudspeaker will project sound in a line of sight towards a viewer position without obstruction of the sound by the display device.

84. The system of claim 83, wherein the loudspeaker enclosure is a subwoofer operably configured to slide generally vertically into and be received in the in-wall space.

85. The system of claim 84, further comprising a power amplifier operable to be connected to a power and signal distribution circuit through a connector.

86. The system of claim 83, wherein the loudspeaker enclosure includes a tweeter driver and is operably configured to slide generally horizontally into a socket in the in-wall space.

87. The system of claim 83, further comprising a multi-channel electrical connector mounted on the support member and operatively configured to mate with a corresponding multi-channel electrical connector on the speaker to simultaneously connect a plurality of signal channels.

88. The system of claim 83, further comprising a distribution circuit operable to interconnect at least one speaker to an audio power amplifier.

* * * * *